(12) United States Patent
Barton

(10) Patent No.: US 10,351,193 B2
(45) Date of Patent: Jul. 16, 2019

(54) HOLDING DEVICE FOR POSITIONAL CONTROL OF A SHAFT

(71) Applicant: Humanchine Company, Richmond, CA (US)

(72) Inventor: Nicholas A. Barton, Richmond, CA (US)

(73) Assignee: Humanchine Company, Richmond, CA (US)

(*) Notice: Subject to any disclaimer, the term of this patent is extended or adjusted under 35 U.S.C. 154(b) by 609 days.

(21) Appl. No.: 14/821,622

(22) Filed: Aug. 7, 2015

(65) Prior Publication Data

US 2017/0036723 A1    Feb. 9, 2017

(51) Int. Cl.
*B62J 1/08* (2006.01)
*B62K 19/36* (2006.01)

(52) U.S. Cl.
CPC .................. *B62J 1/08* (2013.01); *B62K 19/36* (2013.01); *B62J 2001/085* (2013.01)

(58) Field of Classification Search
CPC ........................... B62K 19/36; B62J 2001/085
USPC ....................................................... 280/281.1
See application file for complete search history.

(56) References Cited

U.S. PATENT DOCUMENTS

| 618,639 | A | * | 1/1899 | Bullard | F16D 1/096 403/370 |
|---|---|---|---|---|---|
| 3,318,170 | A | | 5/1967 | Runkle | |
| 3,861,740 | A | | 1/1975 | Tajima et al. | |
| 4,808,049 | A | | 2/1989 | Cook | |
| 4,872,696 | A | | 10/1989 | Gill et al. | |
| 4,900,182 | A | | 2/1990 | Stillwagon | |
| 5,044,592 | A | | 9/1991 | Cienfuego et al. | |
| 5,517,878 | A | * | 5/1996 | Klein | B62K 21/16 403/371 |
| 5,553,511 | A | * | 9/1996 | Marui | B62K 21/06 280/279 |
| 5,626,355 | A | * | 5/1997 | Voss | B62K 19/30 188/DIG. 1 |
| 5,810,366 | A | | 9/1998 | Montjoy et al. | |
| 5,810,380 | A | * | 9/1998 | Lin | B62K 21/06 280/279 |
| 6,116,684 | A | * | 9/2000 | Williams | B62J 1/00 297/195.1 |
| 6,186,027 | B1 | * | 2/2001 | Nielsen | B62K 21/18 403/365 |
| 6,202,971 | B1 | | 3/2001 | Duncan et al. | |
| 6,354,557 | B1 | | 3/2002 | Walsh et al. | |
| 7,025,522 | B2 | | 4/2006 | Sicz et al. | |
| 8,702,336 | B2 | | 4/2014 | McAndrews et al. | |
| 8,814,109 | B2 | | 8/2014 | Laird et al. | |

(Continued)

OTHER PUBLICATIONS

PCT Chapter I International Preliminary Report on Patentability (IPRP Chapter I) PCT/US2016/045211 dated Jan. 19, 20147. (11 Pages).

(Continued)

*Primary Examiner* — Jacob D Knutson
(74) *Attorney, Agent, or Firm* — Womble Bond Dickinson (US) LLP

(57) ABSTRACT

A holding device for controlling a position of a shaft is disclosed. More particularly, embodiments of the holding device are incorporated in bicycles and bicycle components to control a height of a bicycle seatpost. Other embodiments are also described and claimed.

23 Claims, 17 Drawing Sheets

(56) References Cited

U.S. PATENT DOCUMENTS

| | | | |
|---|---|---|---|
| 8,894,025 B2 | 11/2014 | Wehage et al. | |
| 2004/0258503 A1* | 12/2004 | Tuthill | F16B 39/103 411/431 |
| 2007/0296162 A1 | 12/2007 | Guy | |
| 2009/0067073 A1* | 3/2009 | Vanderslik | B60R 1/078 359/841 |
| 2009/0126521 A1* | 5/2009 | Schroeder | F16B 37/0864 74/127 |
| 2009/0238635 A1 | 9/2009 | Mankadi et al. | |
| 2009/0324327 A1 | 12/2009 | McAndrews et al. | |
| 2012/0039659 A1* | 2/2012 | Sanchez | A45D 34/04 401/122 |
| 2012/0104221 A1 | 5/2012 | Hsu et al. | |
| 2012/0228906 A1* | 9/2012 | McAndrews | B62J 1/08 297/215.13 |
| 2012/0237312 A1* | 9/2012 | Widule | F16B 31/027 411/7 |
| 2013/0093159 A1 | 4/2013 | McAndrews et al. | |
| 2013/0119634 A1 | 5/2013 | Camp et al. | |
| 2013/0221713 A1 | 8/2013 | Pelot et al. | |
| 2013/0230266 A1* | 9/2013 | Earle | B62M 3/003 384/540 |
| 2013/0300163 A1 | 11/2013 | Shirai et al. | |
| 2013/0307299 A1 | 11/2013 | Winefordner et al. | |
| 2014/0061419 A1 | 3/2014 | Wehage et al. | |
| 2014/0205372 A1 | 7/2014 | Kuo et al. | |
| 2015/0034779 A1* | 2/2015 | McAndrews | B62J 1/08 248/125.8 |

OTHER PUBLICATIONS

PCT Chapter I International Preliminary Report on Patentability (IPRP Chapter I) PCT/US2016/045211 dated Feb. 22, 2018. (7Pages).
PCT International Search Report for PCT Counterpart Application No. PCT/US2016/045211, 4 pgs. (dated Jan. 19, 2017).
PCT Written Opinion for PCT Counterpart Application No. PCT/US2016/045211, 5 pgs. (dated Jan. 19, 2017).

* cited by examiner

SECTION A-A

DETAIL A

SECTION B-B

SECTION C-C

SECTION D-D

SECTION E-E

DETAIL B

SECTION F-F

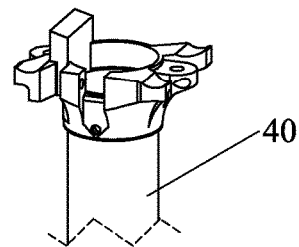
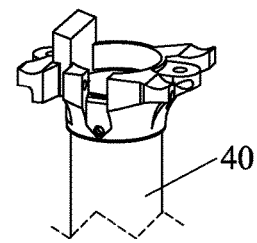
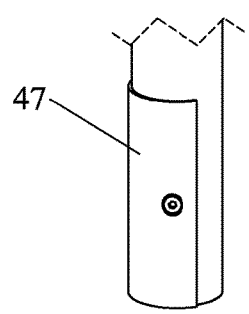
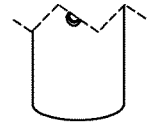
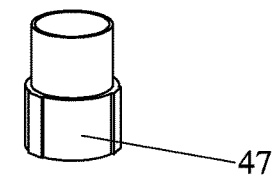
FIG. 18
FIG. 21
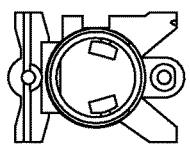
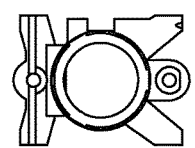
FIG. 19
FIG. 22
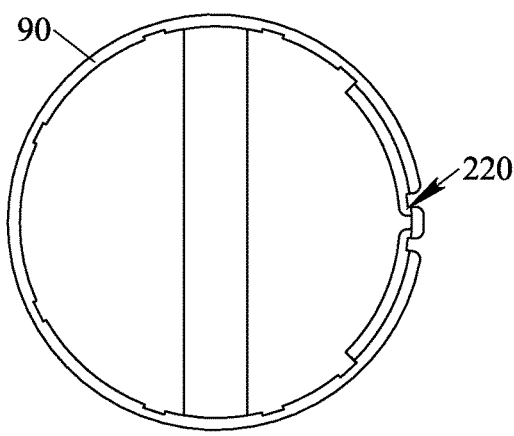
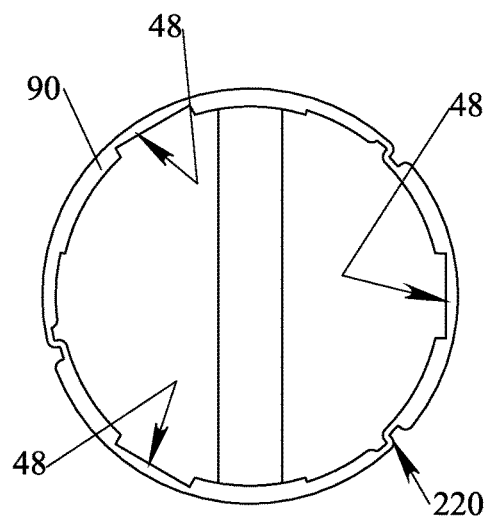
FIG. 20
FIG. 23

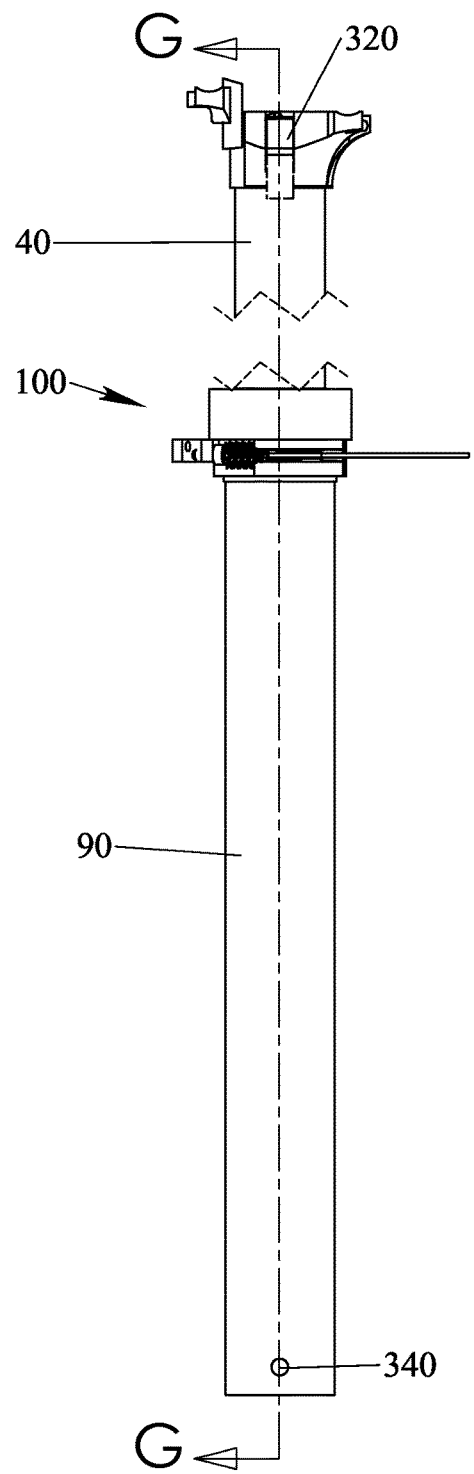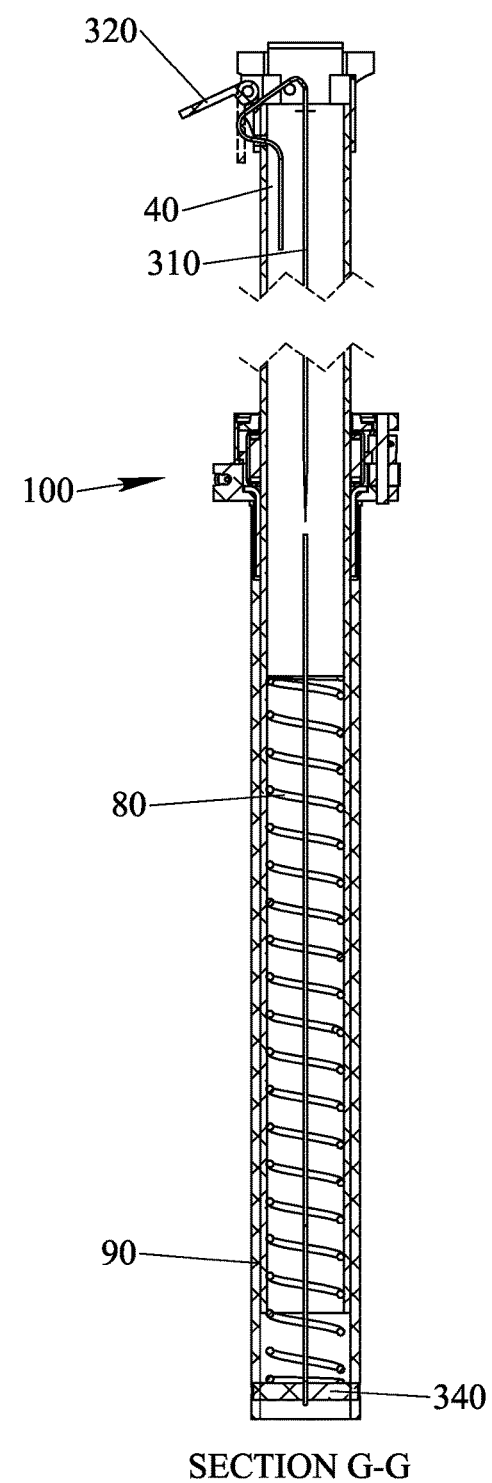
FIG. 24
FIG. 25
SECTION G-G

HOLDING DEVICE FOR POSITIONAL CONTROL OF A SHAFT

BACKGROUND

Field

Embodiments related to holding devices for controlling a position of a shaft are disclosed. More particularly, an embodiment related to a holding device for controlling a height of a bicycle seatpost, is disclosed.

Background Information

Since before 2005 companies began manufacturing bicycle seatposts having integrated mechanisms that allowed a bicycle rider to adjust the height of the post without dismounting the bicycle. This product was well received in the enthusiast mountain bike market, especially for cyclists who like to frequently descend steep and technical terrain during their bike rides. A low seatpost allows the rider better control over the bike when compared to a bike with a seatpost that is properly adjusted for riding efficiency. A low bicycle seatpost allows a larger unobstructed space for the rider to move his body around while standing on the pedals and grabbing the handlebars of his bicycle. A seatpost whose height (position) can be easily adjusted during riding results in faster and safer descending. Other benefits of the adjustable height seatpost are increased comfort mounting and dismounting the bicycle, and easily swapping bicycles between riders without having to adjust the seat position before mounting.

Current designs utilize mechanical stopping means, where a pin or feature in the fixed portion of the seatpost interfaces with a hole or other feature in the moving portion, or hydraulic mechanisms. There are also designs for moving the seatpost with an electric motor and mechanism. Current designs employed for this type of mechanism also include hydraulically actuated mechanisms.

SUMMARY

Current designs for adjustable height seatpost actuation mechanisms have undesirable characteristics. The first undesirable characteristic is that the mechanism adds weight to the bicycle. Because a bicycle is powered only by the rider, any added weight requires additional user power to get equivalent acceleration and, more importantly, velocity up a hill. Other undesirable characteristics involve the user experience, durability, and cost. Many mechanically actuated seatposts have two or more distinct height positions to choose from, while the hydraulically actuated seatposts do not have distinct positions, but rather, they allow the user to select any position, e.g., an infinite number of positions, between full up and full down positions. Current mechanisms which offer an infinite number of selectable positions utilize complex mechanisms that sacrifice durability and weight for performance. Reducing the complexity of such a mechanism without compromise to user experience can reduce cost and increase its durability. With a seatpost mechanism that can be adjusted according to the riders preference, en-route, with appropriate cost and durability, it is logical that it would be equipped on all bicycles that frequent different riders such as those used by rental companies as well as city share bicycle kiosks.

A holding device for controlling a position of a shaft, e.g., a bike seatpost, is disclosed. In an embodiment, the holding device includes a collet, a collar, several rolling members, and a rotational bias mechanism. The collet may have a clamping portion including a collet surface around a central axis. Furthermore, the collar may rotate relative to the collet and include a collar surface facing the collet surface. For example, the collar surface may be separated from the collet surface by a first radial distance at the first location and a second, lesser, radial distance at the second location. A first location on the collet surface may be offset from a second location on the collet surface. The rolling members may be positioned between the collar surface and the collet surface such that rotation of the collar relative to the collet rolls a rolling member from the first location to the second location on the collet surface. Thus, the rolling member may wedge between the collar and the collet when it rolls to the second location to move the clamping portion orthogonal to the central axis. In an embodiment, the rotational bias mechanism is coupled to the collar and biases the rolling member to the second location. A seatpost may be disposed in a channel defined by a clamping surface of the clamping portion. For example, the seatpost may be disposed in a seat tube of a bicycle frame. Thus, rotation of the collar relative to the collet may clamp the clamping surface onto the seatpost to hold the seatpost in place.

In an embodiment, the clamping portion of the collet includes several fingers extending axially from a base portion. Furthermore, either the collar surface or the collet surface may include several ramp surfaces that are circumferentially arranged around the central axis. The rolling member may have a cylindrical bearing placed in rolling contact with a ramp surface. Thus, the cylindrical bearing may roll on the ramp surface to move a finger orthogonal to the central axis. In an embodiment, the ramp surface includes a radially extending stop tang to limit rolling of the rolling member between the collet surface and the collet surface.

The holding device may include other structures to interrelate with those introduced above. For example, the holding device may include a housing connected to the base portion of the collet, and surrounding the collar. More particularly, the base portion may remain fixed relative to the housing when the collar rotates relative to the collet. The holding device may also include a cage between the collet and the collar. In an embodiment, the cage has several circumferentially spaced apart slots, and the rolling members may be disposed in the slots, such that a first rolling member is maintained in rolling contact with a first finger and a second rolling member is maintained in rolling contact with a second finger.

The holding device may also include components to actuate the rotational bias mechanism. For example, a cable may be coupled to the collar to apply a torque to the collar, which biases the rolling member to the second location. Furthermore, an actuator may be coupled to the cable such that applying a force to the actuator applies a counter-torque to the collar through the cable to actuate the rotational bias mechanism and to roll the rolling member to the first location, thereby unlocking the seatpost.

A holding system for controlling a position of a bike seatpost, is disclosed. In an embodiment, the holding system includes a seatpost, a collar, several rolling members, a rotational bias mechanism, and a housing. The collar may be rotatable about the seatpost and include a collar surface that faces a seatpost surface of the seatpost. More particularly, the collar surface may be offset from the seatpost surface at several locations. For example, the collar surface may be separated from the seatpost surface by a first distance at a first location and by a second, lesser, distance at a second location. Thus, several of the rolling members may be disposed between the collar surface and the seatpost surface such that rotation of the collar relative to the seatpost rolls a rolling member from the first location to the second location. This rolling action may wedge the rolling member between the collar and the seatpost to move the clamping portion orthogonal to the seatpost surface. Furthermore, the rotational bias mechanism may be coupled to the collar to bias the rolling member to the second location. The housing may be disposed around the collar and the rolling members, and either the seatpost or the housing may be keyed to each other to limit rotation of the seatpost relative to the housing. Thus, rotation of the collar relative to the seatpost may clamp the rolling members onto the seatpost to hold the seatpost in place.

In an embodiment, the collar surface or the seatpost surface includes several circumferentially arranged ramp surfaces. Furthermore, the rolling members may include a cylindrical bearing. The holding system may include other structures to interrelate with those described above. For example, the holding system may include a cage having several circumferentially spaced slots. The rolling members may be disposed in the slots, such that a first rolling member is maintained in rolling contact with the first ramp surface and a second rolling member is maintained in rolling contact with a second ramp surface.

The holding system may also include components to actuate the rotational bias mechanism. For example, a cable may be coupled to the collar to apply a torque to the collar, which biases the rolling member to the second location. Furthermore, an actuator may be coupled to the cable such that applying a force to the actuator applies a counter-torque to the collar through the cable, to actuate the rotational bias mechanism and to roll the rolling member to the first location, thereby releasing the seatpost.

A holding system for controlling a position of a bike seatpost, is disclosed. In an embodiment, the holding system includes a seatpost, a holding device, and a wear tube. The holding device may control a position of the seatpost along a central axis. Furthermore, the wear tube may be coupled to the holding device and include a tube channel that is coaxially aligned with the seatpost. The wear tube may include a material density less than 0.068 lbs/in$^3$. In an embodiment, the holding device and the wear tube are keyed to each other to limit rotation of the holding device relative to the wear tube. Furthermore, the seatpost and the wear tube may be keyed to each other to limit rotation of the seatpost relative to the wear tube. The wear tube may be positioned between the holding device and a seat tube of a bicycle frame. Furthermore, to limit movement of the seatpost along the central axis, a first end of a connector may be coupled to the bicycle frame and a second end of the connector may be coupled to the seatpost.

The keyed interfaces of the holding system may have various configurations. For example, a key on the seatpost may include a key surface radially outward of a seatpost surface, and the key surface may be around a majority of a perimeter of the seatpost. The seatpost may include several keys, and each key may include a radial protrusion extending radially outward of the seatpost surface. In an embodiment, the wear tube includes an outer surface around the tube channel, and a peripheral path along the outer surface includes circumferential segment(s) and transverse segment(s).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

FIG. 18 is a dimetric view of a seatpost having a key.

FIG. 19 is an end view of a seatpost having a key.

FIG. 20 is an end view of a wear tube incorporating a fold-shaped feature.

FIG. 21 is a dimetric exploded view of a seatpost having a key.

FIG. 22 is an end view of a seatpost having a key.

FIG. 23 is an end view of a wear tube incorporating fold-shaped features.

FIG. 24 is a side view of a bicycle seatpost assembly in accordance with an embodiment.

FIG. 25 is a sectional view, taken about line G-G of FIG. 24, of a bicycle seatpost assembly in accordance with an embodiment.

DETAILED DESCRIPTION

Figure 1:
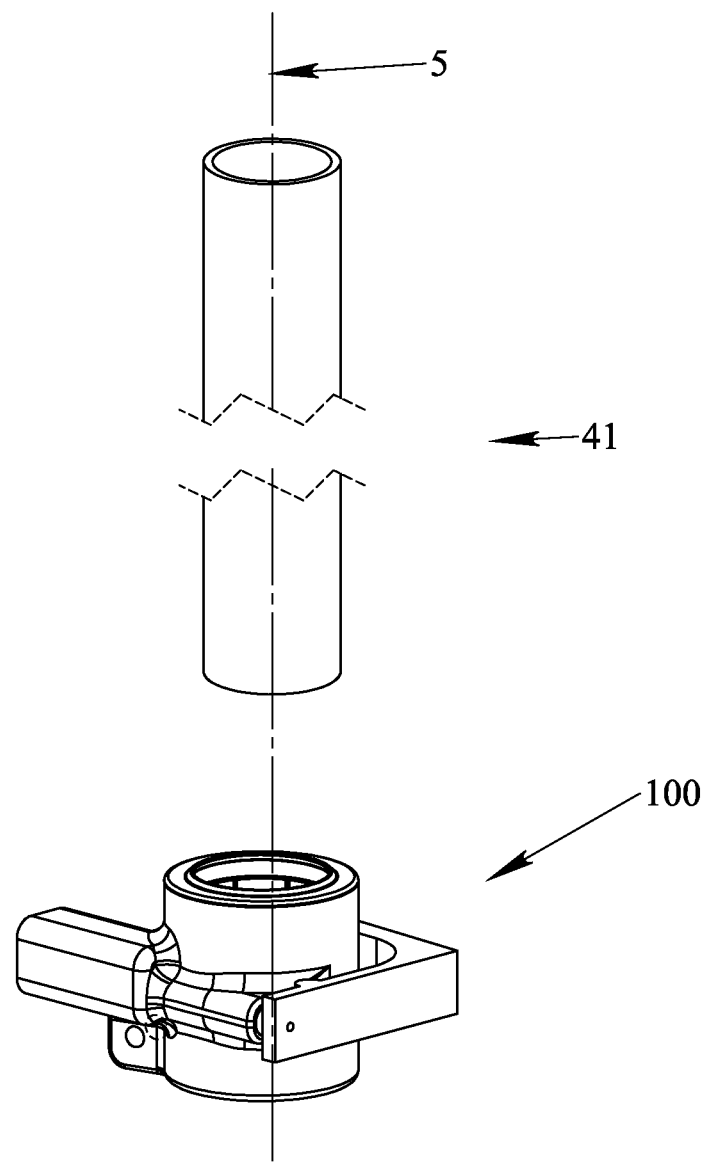
FIG. 1 is an exploded perspective view of a holding system in accordance with an embodiment.

Embodiments describe holding devices for controlling a position of a shaft, particularly for use in adjusting a height of a bicycle seatpost. While some embodiments are described with specific regard to integration within bicycles and bicycle components, the embodiments are not so limited and certain embodiments may also be applicable to any device that requires quick axial adjustment of a shaft position with respect to another fixed component. For example, a holding device as described below may be used as a chuck for a drill, a milling machine, or any other device with a movable component that is adjustable relative to a fixed component.

In various embodiments, description is made with reference to the figures. Certain embodiments, however, may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description, such as "upward" and "downward" may denote a relative position or direction. For example, a seatpost may be described as moving upward relative to a holding device when a bicycle seat moves away from a bicycle frame, even though the seatpost does not move perpendicular to the ground. Nonetheless, such terms are not intended to limit the use of a holding device to a specific configuration described in the various embodiments below.

In an aspect, a holding device for positional control of a shaft utilizes a clamping mechanism, and thus provides some component of a clamping force normal to one or more surfaces of a shaft. The force generates a friction force between the stationary components of the mechanism and the shaft within the mechanism such that the shaft is prevented from moving relative to the stationary components under operational loading. Simultaneously, the holding device allows for an operator to easily release the clamping force on the shaft, change a position of the shaft, and then lock the position of the shaft again with the push of a button or lever.

In an aspect, the clamp and release phases are toggled with very low friction and combined with mechanical leverage for amplification of force. The high clamping forces/loads may be applied to the shaft by moving a collar member in a direction that is nearly transverse to the applied clamping force. Toggling loads required to actuate the collar member between the clamp and release phases may be reduced by supporting the collar member upon rolling members to reduce or eliminate sliding friction during actuation of the collar member.

In an aspect, actuation of a control lever may toggle the holding device between the clamp and release phases. A force on the lever may be less than ten pounds and the distance traveled for actuation may be less than three-quarters of an inch. In one implementation of the mechanism, the operational loading is the dead weight of a bicycle rider plus any dynamic acceleration loading in the direction parallel to the axis of the moving shaft. This clamping principle for the design of such a mechanism eliminates the problems of lash or end play of a shaft when it is retained in its required operational position, and it eliminates the characteristic of the available shaft positions being discrete and pre-set. This clamping principle allows the shaft to be positioned precisely at any point along its travel with a resolution limited by the precision of control of the shaft when it is in the free, unclamped, position-changing state. Thus, the holding device allows adjustment of the seat to many, but not necessarily infinite, locations within an acceptable tolerance range.

In an aspect, the control lever used to actuate the holding device may be located in a remote location away from the holding mechanism and near a hand of the operator. For example, an actuator lever assembly may be connected to a cable, which is connected to the holding mechanism disposed in a housing at a location remote from the hand of the operator. The cable may transmit forces from the control lever to the holding mechanism such that the operator may apply an operational force to the control lever near a hand grip while riding a bicycle to cause the holding mechanism to clamp/unclamp a seatpost of the bicycle during the ride.

Referring to FIG. 1, an exploded perspective view of a holding system is shown in accordance with an embodiment. The holding system includes a shaft 41 and a collet assembly 100, which are axially aligned, but not assembled. The shaft may be inserted through a channel of the collet assembly 100 when the collet assembly is actuated to allow the movement. When the shaft 41 is inserted into the collet assembly 100, it may be locked in position. The collet assembly 100 may not rotate about a central axis 5 passing through the shaft 41 and collet assembly 100, or move along the central axis 5 in either direction when locked. The collet assembly 100 can be actuated to unlock the position of the collet assembly such that the shaft 41 is released and can be moved with respect to the collet assembly 100 along the central axis 5 and the shaft 41, or rotated about the central axis 5 and the shaft 41.

Figure 2:
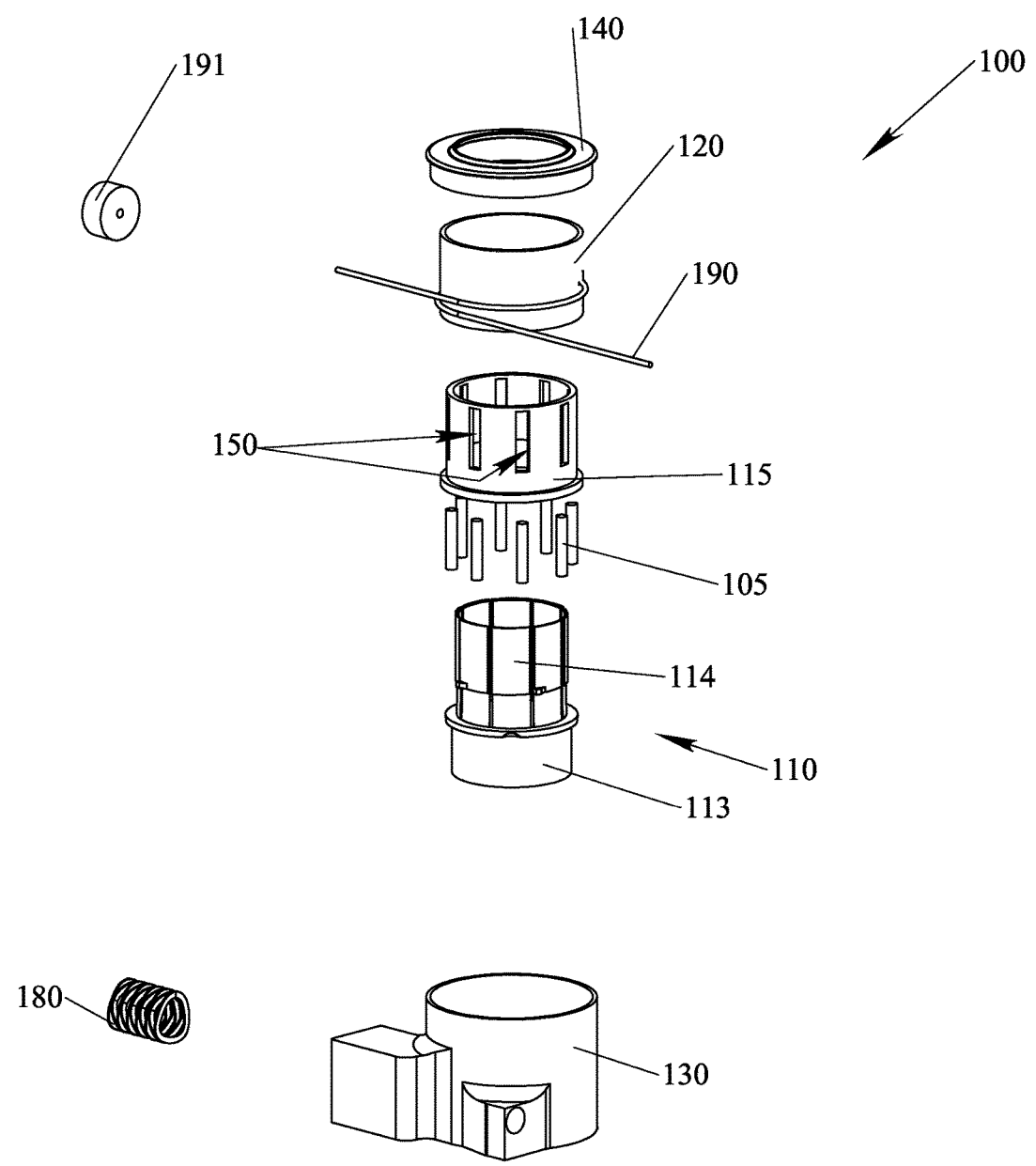
FIG. 2 is an exploded dimetric view of a collet assembly of a holding device in accordance with an embodiment.

Referring to FIG. 2, an exploded dimetric view of a collet assembly is shown in accordance with an embodiment. The collet assembly 100 may include a collet 110, rolling members 105, a roller cage 115, a cable 190, and a collar 120. When assembled, roller cage 115, rolling members 105, and collar 120 may be placed around the collet 110. When cable 190 is wrapped around collar 120, housing 130 may be connected to the collet 110, and the seal 140 may be attached to the housing 130. The seal 140 may prevent the assembled rolling members 105, cage 115, and collar 120, from sliding off of the collet 110 in one direction while the collet 110 and housing 130 may prevent them from moving in the opposite direction. With the cable stop 191 connected to one end of the cable 190, the collet spring 180 may be captured about the cable 190 between the housing 130 and the cable stop 191. Thus, the collet spring 180 may apply tension to one end of the cable. Such tension in the cable 190 may produce a tangential force applied to the collar 120 which may act as a rotational bias force to lock the collet assembly 100.

The collar 120 is rotatable about an axis of the collet 110 by rolling on rolling members 105, which may roll upon one or more surfaces of the collet 110. For example, the rolling members 105 may roll on respective surfaces of fingers 114 extending from base portion 113. When the collar 120 is rotated about the collet 110, while supported by the rolling members 105, the rolling members traverse the respective surfaces of the collet 110 from a first location to a second location. The change in relative position between the collet 110 and the collar 120 may roll the rolling members 105 into a smaller separation gap between the collet 110 and collar 120, and thus, the rolling members may become wedged between the collet 110 and the collar 120. This wedging can cause movement of the collet 110 and/or collar 120, e.g., by reversibly deflecting the collet 110 away from the collar 120. Thus, the deflecting component may provide a clamping force on the shaft 41 to hold the shaft within the channel of the collet 110.

In an embodiment, each of the rolling members 105 of collet assembly 100 are guided. For example, each rolling member 105 may be disposed in respective slots 150 formed in the cage 115. The slots 150 may be axial slots that are circumferentially separated from each other. The circumferential separation between slots 150 may be a predetermined angular separation or circumferential distance such that, when one rolling member 105 is in rolling contact with a corresponding finger 114, another rolling member 105 is in rolling contact with a different corresponding finger 114. Thus, a roller cage 115 may maintain a predetermined separation of the rolling members 105 and may provide a mechanical constraint other than a purely frictional constraint such that the rolling members 105 resist being shaken out of their predetermined locations by vibration. More particularly, it is contemplated that unguided rolling member 105 may be shaken out of their predetermined location when the assembly is in an actuated state during a vibration event. Here, the actuated state refers to a state where the user actuates the assembly and causes a counter-torque to be applied to the constant rotational bias mechanism. In such an actuated state, the collar 120 may be rotated in a direction that would roll a rolling member 105 across the surface of the collet 110 from a first location where a collet surface is separated from a collar surface by a first gap distance, to a second location where a distance between the collet 110 surface and the collar 120 surface increases to a greater second gap distance. Thus, roller cage 115 may be used to maintain separation of the rolling members 105 and also allow for limitation of motion of the rolling members. If one rolling member is positioned at a first position where the distance between one collet 110 surface and one collar 120 surface is a desired distance, then the cage maintains the relative positions of each of the other rolling members such that the distance between a collet 110 surface and collar 120 surface adjacent to the other rolling members is simultaneously a desired distance. The cage may help to keep all components aligned for correct functioning of the mechanism.

In an embodiment, the cage 115 is shaped as a hollow cylinder having several radial openings which are roughly the same shape as the profile of the rolling members 105 it is designed to guide. The cage 115 may abut against one or more of the surrounding components such as the collet 110, seal 140, rolling members 105, or collar 120, and may operate with low wear and frictional drag under designed relative movement between each member. Furthermore, the cage 115 may interface with a stop tang feature (see FIG. 4), which limits the rotation of the cage 115 about the central axis 5 with respect to the component having a stop tang feature. More particularly, the stop tang may be a feature that limits unwanted travel of the rolling members 105, and thus, limits the rotation of the cage 115. The stop tang may extend from a surface on the collet 114 or collar 120, as described below. In an embodiment, the stop tang may also extend from another component which is indirectly coupled to either the collar 120 or collet 110.

Still referring to FIG. 2, the collet assembly 100 may be actuated by an actuation mechanism that imparts a rotational force, e.g., a torque, on collar 120, cage 115, or collet 114, to cause relative rotational movement between collar and collet. For example, the actuation mechanism may include a cable 190 that is attached directly to a surface of collar 120, cage 115, or collet 114, or that imparts a frictional force on such surface. For compactness of the assembly, one method of integrating such an actuation cable 190 is by wrapping it one or more times around the outer surface, e.g., the outer circumference, of the collar 120. This arrangement conveniently transforms the axial displacement of the cable 190, due to user actuation input or rotational bias movement input, into rotational motion of the collar 120, e.g., via a frictional engagement between the cable 190 and the collar 120.

An exploded view showing the arrangement of the cable 190 as it is assembled to the collar 120 is illustrated in FIG. 2. An optional cable stop 191 is also shown in FIG. 2, which can be used to provide an interface between the collet spring 180 and the cable 190. More particularly, the cable stop 191 may be passed over one end of the cable 190 and attached to the cable, e.g., via a set screw, by swaging, or otherwise deforming the cable stop onto the cable. Furthermore, the cable stop 191 may be connected to one end of the collet spring 180, and another end of the collet spring may be connected to the housing 130. Thus, the collet spring 180, which may be a compression spring, may exert a force on cable stop 191 away from the housing 130, and the separation force may be transmitted by cable stop 191 to cable 190 through the above-mentioned attachment point to provide a tensile force on cable 190. Because the cable 190 may only be loaded in tension by a tensile force exerted on one end by the collet spring 180, a feature may be used to prevent slippage of the cable against the collar 120. For example, cable guides may be used to direct the cable in circuitous route with many tight jogs over an outer surface of the collar 120 so as to increase the contact force and thus frictional holding force between the cable 190 and the collar 120. The guides may include, e.g., pegs, protrusions, etc., which the cable may be wrapped around in a predetermined route over the collet surface. Another feature, referred to as a cable cleat 121, may be used to prevent movement of a cable 190 with respect to the collar 120, and is described further below.

Figure 3A:
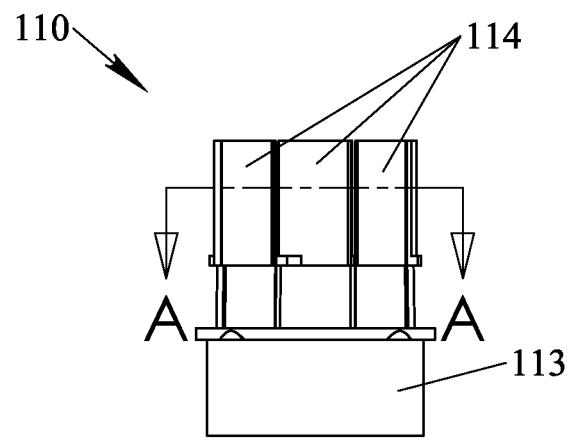
FIG. 3A is a side view of a collet in accordance with an embodiment.

Referring to FIG. 3A, a side view of a collet is shown in accordance with an embodiment. The collet 110 may include a base portion 113. The base portion 113 may be cylindrical and tubular, such that the base portion can be disposed around the circumference of a shaft 41. The base portion 113 may support a clamping portion of the collet. For example, several fingers 114 may extend from the base portion 113 in the axial direction to provide the clamping portion. The clamping portion fingers 114 are thus moveable in the radial direction from the shaft 41 such that they can be elastically deflected to press tightly against the shaft or deflected away from the shaft and the central axis of the shaft.

In an embodiment, the collet 110 may not include individual fingers extending from a base portion 113, and a collet 110 may be formed from flexible material allowing sufficient flexibility such that a clamping portion of the collet can be deformed, squeezed, or resiliently bent inward towards, and outward away from, a shaft 41 it is sized and configured to clamp. For example, collet 110 may include a polymeric and/or elastomeric tube that can be crushed inward by a uniform radial force applied on an outer tube surface.

In an embodiment, a collet 110 may have one or more individual parts which may be hinged about a base portion 113 such that they can be moved towards and away from the surface of a shaft 41. For example, fingers 114 may be attached to the base by living hinges, e.g., a material joint that is contiguous with fingers 114 and base portion 113, but which is thinner than those components to allow material strain to be focused at the living hinge when the fingers 114 are flexed. Alternatively, fingers 114 may be connected to base portion 113 by one or more pin hinges that allow the fingers to flex radially inward and outward.

In addition to being shaped to receive shaft 41, collet 110 may also be formed to engage with and/or be received by a mating component. For example, the collet base portion 113 may be shaped in a way that allows it to be attached to a bicycle frame using a standard bicycle seat post clamp. More particularly, an outer contour of the base portion 113 may be sized and shaped to be inserted into a bicycle frame tube 21 (see FIG. 15). In other words, the base portion 113 may slip into the frame tube as would a common bicycle seat post, e.g., with a slip or sliding fit. Accordingly, the base portion 113 may be formed with a wall thickness, i.e., a thickness between the outer surface that faces the bicycle frame tube and an inner surface that faces the shaft, to resist deformation when the seat post clamp 70 is tightened around the bicycle frame tube. In an embodiment, this thickness may be in a range of 0.018 inch to 0.050 inch.

Figure 3B:
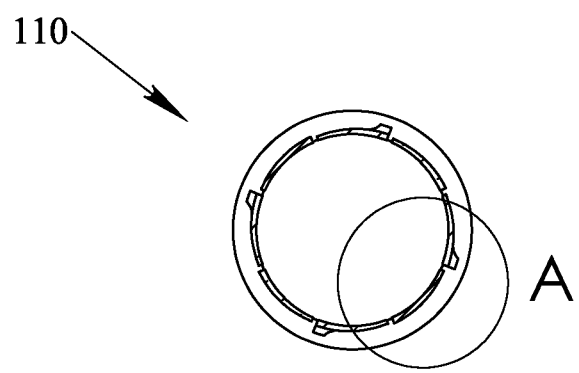
FIG. 3B is a section view, taken about line A-A of FIG. 3A, of a collet in accordance with an embodiment.

Referring to FIG. 3B, a sectional view, taken about line A-A of FIG. 3A, of a collet is shown in accordance with an embodiment. FIG. 3B shows the origin of Detail view A, also. In the embodiment the central axis is normal to the view and centered within a channel passing through a center of collet 110. The collet 110 clamps upon a cylindrical shaft 41 (not shown) which passes through the cylindrical channel about the axis. The fingers 114, and thus the collet surfaces of the fingers, may be circumferentially arranged about the central axis. While the profile of each finger can be observed from this section view, it is further magnified in FIG. 4. FIG. 3B shows eight fingers 114 arranged circumferentially about the central axis. The collet 110, however, may contain as few as one finger 114 or as many fingers as can fit about the central axis of the shaft 41. The limitation on the number of fingers is dependent upon the diameter of the shaft 41 and the distance that a rolling member 105 must traverse across each finger 114 for operation. The distance that a rolling member may traverse across each finger for operation is dependent on both the chosen material and the design requirements of the mechanism. For example, the distance may vary based on a predetermined requirement for shaft holding force, operator actuation force, or actuated mechanism shaft drag force. The fingers 114 must move to a position that achieves sufficient clamping force (a locked state) while also being able to move to a position where the shaft 41 moves freely (an unlocked state). The distance that a rolling member rolls across each finger 114 to toggle between these states may be affected by the chosen angle of a ramp-shaped feature on each finger 114, and can be further influenced by additional ramp-shaped features that may be on the collar 120 component. Thus, although the mechanism can have as few as one finger and a corresponding rolling member, it may be advantageous to have more than two fingers evenly distributed about the central axis of the collet 110 such that radial forces are balanced and the forces applied by collar 120 can be canceled. Each finger may be separated from a finger next to it by a thin slit, which allows the finger 114 to move independently of the adjacent fingers. Four stop tang 116 features are also visible in FIG. 3B. It is not necessary to have the same number of stop tang features as fingers 114 but, as with the number of fingers, it may be advantageous to have more than two evenly distributed about the central axis for cancellation of reaction forces.

Figure 4:
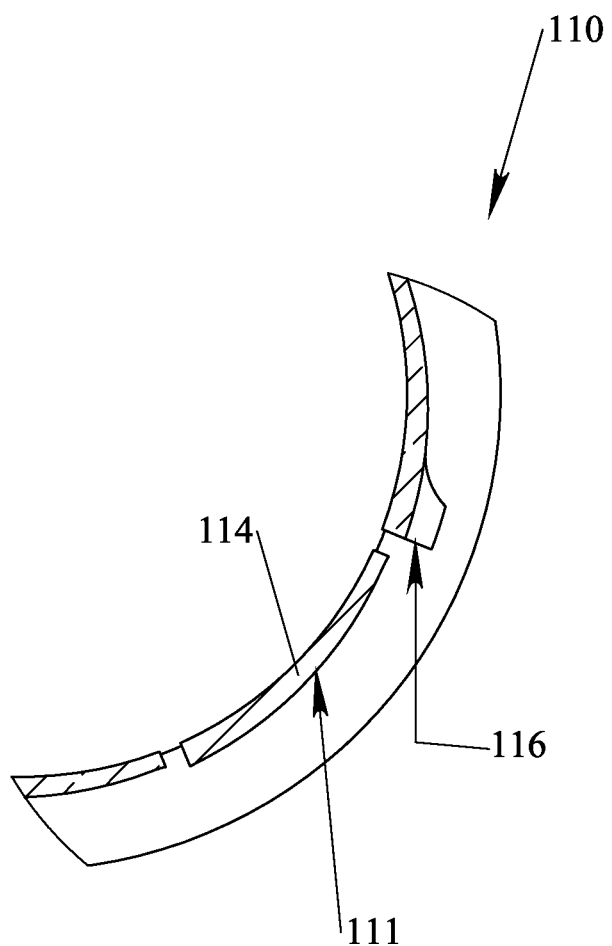
FIG. 4 is a detail view, taken from Detail A of FIG. 3B, of a collet in accordance with an embodiment.

Referring to FIG. 4, a detail view, taken from Detail A of FIG. 3B, of a collet is shown in accordance with an embodiment. Each finger of the collet may include an inner surface and an outer surface separated by a thickness. More particularly, an outer surface of collet 114, which may be referred to as a collet surface, may extend from one circumferential edge of the finger 114 to another circumferential edge of the finger. Accordingly, each collet surface may include locations in a circumferential direction. That is, collet surface may include a first location at an intersection of the collet surface and a first radial line radiating from central axis, and a second location at an intersection of the collet surface and a second radial line radiating from the central axis. The first location may be offset, e.g., circumferentially offset, from the second location. This collet surface may be referred to as a ramp surface 111. Each finger 114 may include an inward-facing clamp surface exposed toward an outer surface of the shaft 41 (not shown). The clamp surfaces provide an inner surface for each finger and for collet 110 as a whole. Thus, the clamp surfaces may press against the outer surface of the shaft to provide a friction interface between the shaft 41 and the collet assembly 100. Each finger may also include a collet surface facing outward away from the shaft and separated from the clamp surface by a thickness of the finger.

As shown in FIG. 4, one or more of the collar surfaces include a ramp surface 111. The ramp surface 111 may include a thickness of the finger 114 which increases with respect to position along a line traversing a segment of circumference about the central collet axis. In an embodiment, this thickness of a finger may vary traversing about the circumference of the collet 110, or about an arc of a finger, such that at a first location, e.g., a first circumferential edge of a finger, it has a first thickness and at a second location, e.g., a second circumferential edge of the finger, it has a second thickness greater than the first thickness. Two surfaces connecting the thinner portion and the thicker portion of the collet may be designed to interface with components of the clamping mechanism. One surface, being the clamping surface, may take on the same surface profile of the shaft that it is designed to clamp upon in order to reduce the stress on each component. The other surface may be designed as a ramp such that it allows the rolling member 105 to roll smoothly from the first location to the second location on the ramp surface 111 of the collet 105, and then back again. When the mechanism is actuated to cause rolling of the rolling members 105, it may be the change in thickness of the collet 110 that causes a change in geometry of the collet assembly 100 to result in a clamping force being applied to a shaft. More particularly, the rolling members 105 may include solid cross-sectional areas having a uniform diameter such that, when the gap between the ramp surface 111 and the opposing collar surface is less than the rolling member diameter 105, the rolling member 105 will wedge between the ramp surface 111 and the collar surface to deflect the collet away from the collar, and thus, lock the collet 114 and collar 120 together and clamp onto shaft 41.

One skilled in the art will appreciate that the deflection of collet 110, e.g., inward, to clamp onto shaft 41 may be caused by the rolling members 105 moving from a first point between collar 120 and collet 110, e.g., having a larger gap, to a point between collar 120 and collet 110 having a smaller gap. More particularly, when the rolling members 105 are wedged into the smaller gap, further advancement of the rolling members 105 may only be allowed by a deformation of the collet 110 or the collar 120 to widen the gap and receive the rolling members 105. Accordingly, the deformed component, e.g., the collet 110, may be deflected and/or biased inward to clamp onto the shaft 41. From this understanding, one skilled in the art can derive other embodiments, such as an embodiment discussed below in which a collet does not require a ramp feature or changing thickness with respect to a clamping surface, and the fingers may be shaped as segments of a constant thickness hollow cylinder. In this alternate embodiment, ramp surfaces may lie on a different component, such as on a collar. Further still, one skilled in the art may be led to additional embodiments in which such a collet may not be cylindrical in shape and it may not operate on the external surfaces of a shaft. For example, when the shaft is hollow and the clamping mechanism expands to clamp upon an inner surface of the hollow shaft, one or more ramp surfaces may be formed on an internal surface of the collet such that rolling members roll on the ramp surfaces radially between the collet and a collar located within an inner channel of the collet. Thus, the collar could rotate about a central axis inside the shaft, and the rolling members could roll about the inner surface of the collet, between the collar and the collet, to urge the collet radially outward such that the external surface of the collet clamps upon the internal surface of that shaft.

Various surface modifications and/or treatments may be used to alter the surface interactions between collet assembly 100 and the shaft 41. For example, a clamping surface of collet 110 may be coated with polymer materials to change the frictional behavior between the clamping surface and the shaft 41. Similarly, a surface roughness of the collar may be altered, e.g., made more or less rough, to alter the frictional behavior, e.g., to increase friction between a rolling surface of the collar and the rolling members 105, thereby reducing the likelihood of rolling member slippage. In another embodiment, a shim can be inserted between the collet 110 and the shaft 41 to provide favorable friction characteristics between the stationary components and the shaft 41 as well as protect the shaft from wearing or abrading. Introduction of a collet 110 may allow for alteration of the friction interface between the shaft 41 and the collet assembly 100 without interfering with the function of rolling members 105 and associated guiding hardware, e.g., cage 115.

Referring again to FIG. 4, in an embodiment, the collet 110 includes a collet stop tang 116. As mentioned above, the collet stop tang 116 can be used to limit the motion of a roller cage 115, and thus limit the position of one or more rolling members 105. Alternatively, the collet stop tang 116 may limit the motion of the rolling members 105 (when the stop tang height is less than a distance between the collet 110 and the cage 115), and thus limit the position of the roller cage 115. The collet stop tang 116 may include one or more faces that interface with the cage 115 such that it stops the cage 115 from moving further along its path while guiding the rolling members 105. In an embodiment, it is feasible that a stop tang 116 may protrude from the ramp surface 111 of a collet 110 even in the absence of a cage 115, as it can be used to limit the position of one or more rolling members 105 by having a face that is disposed with its normal nearly normal to the direction that the rolling member 105 is to be stopped. It will be appreciated that the stop tang 116 is described above and illustrated in FIG. 4 as extending radially from a surface of collet 110, but it is also contemplated that the stop tang 116 may extend radially from the collar 120.

Figure 5A:
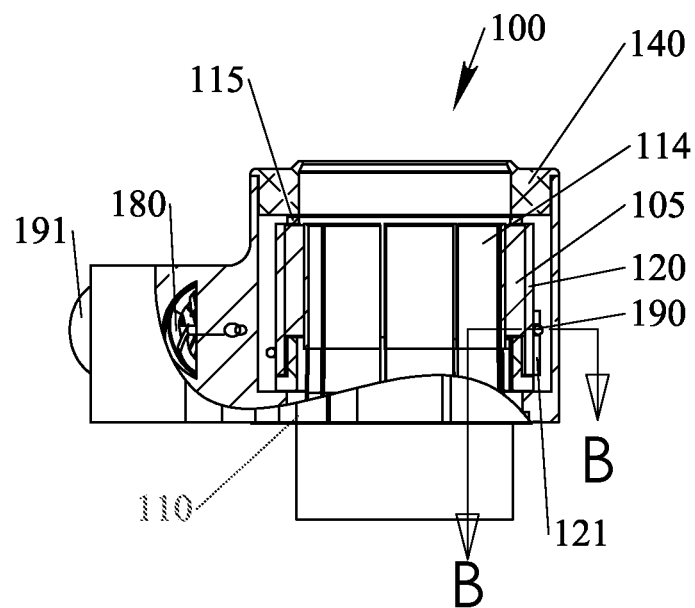
FIG. 5A is a cutaway view of an assembled collet assembly in an unlocked (actuated) configuration in accordance with an embodiment.

Referring to FIG. 5A, a cutaway view of an assembled collet assembly 100 in an unlocked (actuated) configuration is shown in accordance with an embodiment. In an embodiment, each finger 114 increases in thickness in the same angular direction about the axis extending through a central channel of collet 110, to form a ramp shape that can enable the desired clamping effect described above. That is, each finger 114 may be forced to deflect radially inwards toward the shaft 41 when the collar 120 is rotated in the angular direction in which the ramp surface 111 of fingers 114 increase in thickness (or the direction in which a gap distance between the ramp surface 111 and an opposing surface decreases). In an embodiment, rolling members 105 can be disposed between the outside of the finger 114 and the inside of the collar 120. More particularly, rolling members 105 may be located between the collar surface and the collet surface such that, when the collar 120 is rotated in the angular direction about the central axis of the collet 110, a rolling member 105 is rolled between the collar surface and the collet surface. The rolling of rolling member may be, for example, between the first location on collet surface and a second location on collet surface. More generally this can be described as an arrangement between the collet 114 and collar 120 where one collar surface is separated from one collet surface where the annular gap between the surfaces is larger at a first location and smaller at a second location.

Figure 5B:
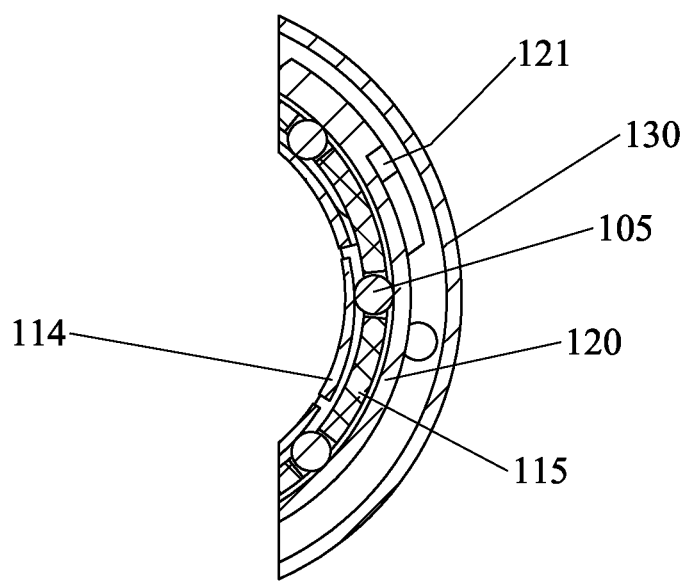
FIG. 5B is a sectional view, taken about line B-B of FIG. 5A, of an assembled collet assembly in an unlocked (actuated) configuration in accordance with an embodiment.

Referring to FIG. 5B, a sectional view, taken about line B-B of FIG. 5A, is shown in accordance with an embodiment. In an embodiment, the collar 120 includes a collar surface facing the collet surfaces of the clamping portion. The collar 120 surface may be disposed radially outward of the shaft (not shown) and the collet 110. The collar 120 may be rotatable relative to the collet 110 about the central axis 5. A rolling member 105 is shown between the collar 120 and a finger 114 of the collet 110 at a first location. This first location is near the thinner end of finger 114 such that the finger is not deflected radially inwards towards the shaft due to the space between the finger 114 and the collar 120 at the point that the rolling member 105 is between the collar 120 and the collet 110. More particularly, at the first location, the clamping surface is separated from the inner surface of the collar by a first distance through the rolling member.

Figure 5C:
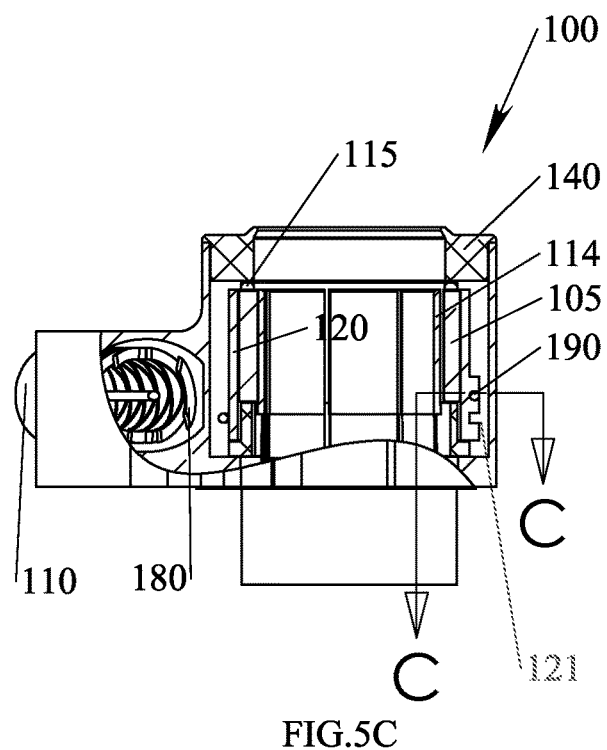
FIG. 5C is a cutaway view of an assembled collet assembly in a locked configuration in accordance with an embodiment.

Referring to FIG. 5C, a cutaway view of an assembled collet assembly in a locked configuration is shown in accordance with an embodiment. The collet assembly 100 may require a rotational bias torque be applied about the axis of the shaft 41 and collet 110 such that the collar 120 is forced in the angular direction with respect to the stationary collet 110 in order to clamp the shaft 41. This can be achieved by any mechanical means, including manual force by an operator, magnetic field force, linear spring force, torsion spring force, or any other force generating means conveyed between the stationary parts and moving collar 120.

Figure 5D:
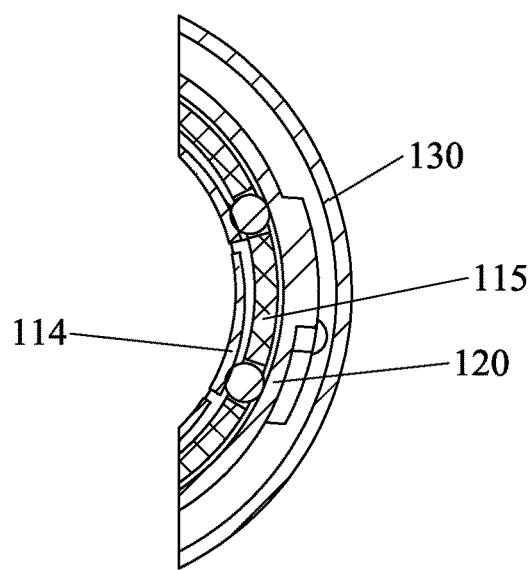
FIG. 5D is a sectional view, taken about line C-C of FIG. 5C of an assembled collet assembly in a locked configuration, in accordance with an embodiment.

Referring to FIG. 5D, a sectional view, taken about line C-C of FIG. 5C, of an assembled collet assembly in a locked configuration is shown in accordance with an embodiment. In an embodiment, the mechanism that provides a radial force on the fingers 114 to press the clamp surfaces against the outer surface of the shaft 41, and thus to clamp onto the shaft 41, includes the rolling members 105 rolling against the collar 120. The collar 120 may include a collar surface facing the collet surfaces of the clamping portion, and the rolling members 105 may be between the collar surface and the collet surface. More particularly, the collar surface may be disposed radially outward of the shaft 41, collet 110, and rolling members 105. As the rolling member 105 traverses towards the thicker end of the finger 114, the finger must displace in the radial direction towards the shaft 41. More particularly, when the rolling member 105 rolls to a second location, the clamping surface is separated from the inner surface of the collar by a second distance through the rolling member, which is greater than the first distance described above with respect to FIG. 5B. Thus, FIG. 5D shows the same cross-section of the collet assembly as illustrated in FIG. 5B, but where the collar 120 has been rotated about the axis to roll the same rolling member 105 to the second location where the annular gap is smaller. Thus, the collet 114 and, more particularly, the fingers 114 of the collet 110 move inward towards the axis in order for the rolling member 105 to fit between the collet 114 and the collar 120 at this second location.

For a collet assembly 100 designed to clamp around a shaft having a nominal diameter of 0.9 inch to 1.2 inches, the shaft contact members, or fingers 114 in one embodiment, need to deflect only 0.001 inch to 0.004 inch. By implementing a ramp surface 111 having an angle at 1 to 8 degrees (from the illustrated tangent) the rolling members travel 0.25 inch to 0.01 inch about the ramp surface. This mechanism can be described as a reducer, where tangential motion of the collar 120 is converted into radial motion of the rolling members 105 or fingers 114, but the converted motion is reduced by a ratio determined by the geometry of the mechanism. More particularly, for a given distance traveled by the collar 120, the clamping component may only move a fraction of that distance, depending on the reduction ratio. For this example the reduction ratio can be between about 5:1 and 500:1. The reduction ratio may or may not be a constant with respect to the position of the collar 120 or rolling members 105 about the shaft 41. The collet assembly 100 mechanism lends itself to having a variable reduction ratio dependent on a position of the components. Increasing ramp 111 angles decreases the radial force on the rolling member, and decreases the reduction ratio, for a given tangential force, and thus, for ramp surface 111 angles greater than about 8 degrees, the rolling members 105 may slip. When the mechanism is combined with other mechanisms or levers, as discussed elsewhere, the total mechanical advantage of the mechanism can be described as an actuation leverage ratio. The actuation leverage ratio describes the ratio of clamping force on the shaft 41 to the required force for actuation of the mechanism, which disengages the clamping force on the shaft 41. Further, the actuation leverage ratio can be increased by adding an additional lever reduction stage remotely from the aforementioned mechanisms.

Figure 6A:
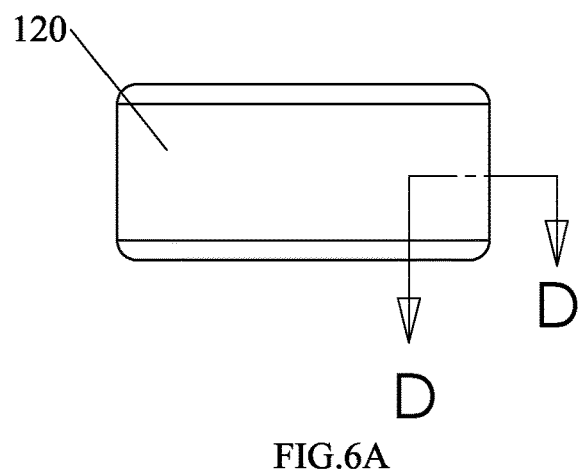
FIG. 6A is a side view of a collar in accordance with an embodiment.

Referring to FIG. 6A, a side view of a collar 120 is shown in accordance with an embodiment. The collet assembly 100 may include a collar 120 that includes one or more ramp features. These ramps may include ramp surfaces 111 similar to the ramp feature described in relation to the collet surface above. FIG. 6A also shows the origin of cut section D-D in FIG. 6B.

Figure 6B:
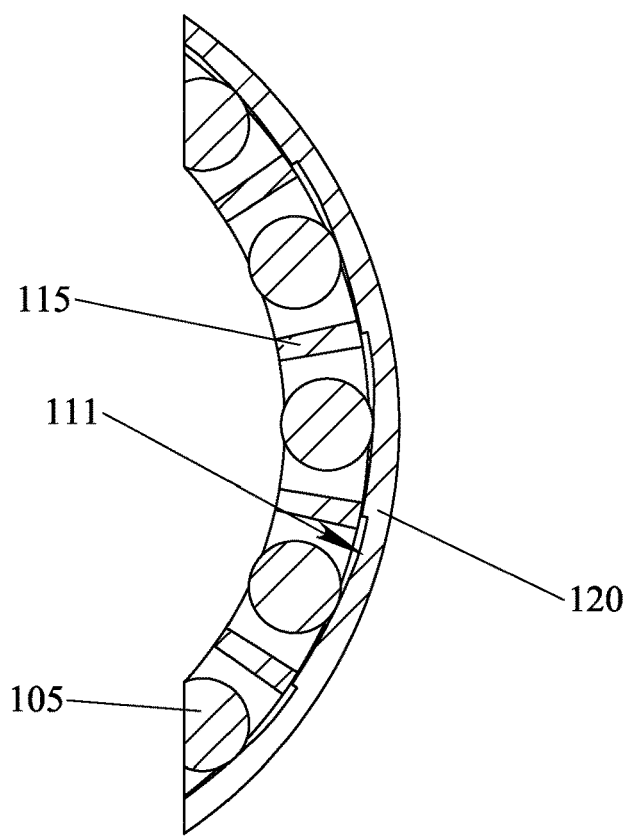
FIG. 6B is a sectional view, taken about line D-D of FIG. 6A of a collar, in accordance with an embodiment.

Referring to FIG. 6B, a sectional view, taken about line D-D of FIG. 6A, of a collar is shown in accordance with an embodiment. The ramp surface 111 may be disposed on one surface of the collar 120 instead of, or in addition to, having a ramp feature on surfaces of the finger 114 or collet 110. Accordingly, each collar 120 surface may include locations that vary in radial position in a circumferential direction. That is, collar surface may include a first location at an intersection of the collar surface and a first radial line radiating from central axis 5, and a second location at an intersection of the collar surface and a second radial line radiating from the central axis 5. The first location may be offset, e.g., circumferentially offset, from the second location. This collar surface may be referred to as a ramp surface 111. In an embodiment, the collar 120 has sixteen ramps having ramp surfaces 111 arranged in a circumferential fashion about the central axis. As in the above-described embodiments having the ramp features on the collet 110, the limitation on the number of ramp features on the collar 120 depends on a diameter of the shaft 41 and a distance that a rolling member 105 must traverse to toggle the collet assembly 100 between a locked state and an unlocked state. The distance that a rolling member 105 traverses during a locking/unlocking operation is dependent on both the chosen material and the design requirements of the mechanism. For example, the distance may depend on a required shaft holding force, operator actuation force, or actuated mechanism shaft drag force. The distance that a rolling member rolls across ramp surface 111 is affected by the chosen angle of each ramp feature. As described further below, a collar 120 having ramp surfaces 111 may be used in a collet assembly 100 that includes a collet 110 or in a collet assembly 100 that does not include a collet 110.

In an embodiment, a collet assembly 100 having a collar 120 with one or more ramp surfaces 111 includes a collet 110. Fingers 114 protruding from the collet 110 can be shaped as segments of a cylinder with constant thickness, as has been mentioned earlier. No illustration of this collet shape is provided here. In an embodiment, the fingers 114 may move inwards towards the axis and shaft 41 when the rolling members 105 traverse from a first to a second location on the surface of the collar 120 where the second location has a smaller inner radius than the first location. This differs from embodiments where no ramp features exist on the collar. Thus, in an embodiment, the rolling members may move inwards towards the axis of the collet 110 during the clamping operation, rather than remaining at the same radial distance from central axis 5 in the case of a collar 120 having a constant inner radius. The ramp 111 on the collar 120, exemplified in FIG. 6B, is on its interior face. The radius increases as you traverse angularly about central axis 5 along the inner surface of the collar 120. When the collar 120 is rotated about the collet 110 axis, in the same angular direction as the increasing radius, the rolling member 105 rolls in the same direction but it traverses at half the angular velocity (half the angular velocity between the stationary collet 110 and the collar 105). When the rolling member 105 traverses the inner surface of the collar 120, i.e., rolls along ramp surface 111, the rolling member moves radially inward toward central axis 5.

This embodiment, as with many others, can benefit from features previously described above. These include but are not limited to a roller cage 115 to separate and retain the rolling members 105 within collet assembly 100, or a collet stop tang 116. To limit the rotation of collet 110 and/or collar 120, a stopping feature, e.g., stop tang 116, that limits a rolling distance of the rolling members 105 may protrude from the housing 130, collet 110, or collar 120.

Figure 7:
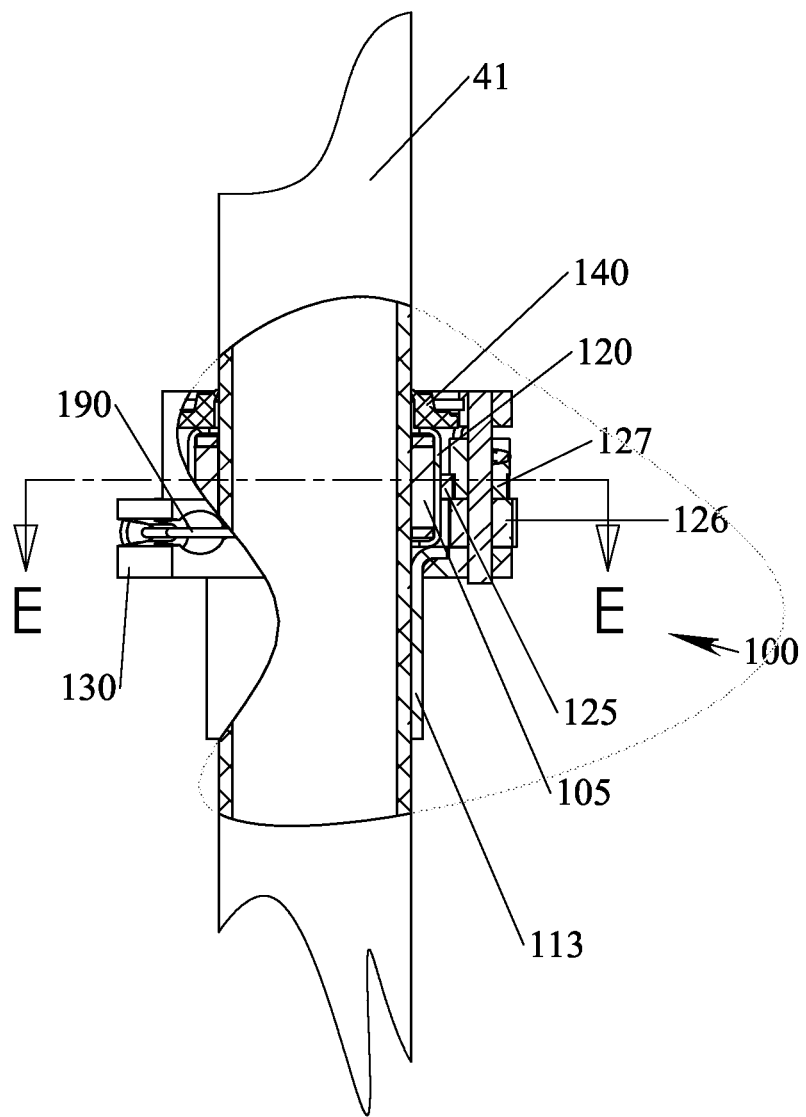
FIG. 7 is a cutaway view of a collet assembly assembled with a shaft in accordance with an embodiment.

Referring to FIG. 7, a cutaway view of collet assembly 100 assembled with a shaft 41 is shown in accordance with an embodiment. Collet assembly 100 may include a collar 120 and not a collet 110. More particularly, the stationary collet component may be omitted from collet assembly in an embodiment.

For example, a collet member may not be disposed between the shaft 41 and the collar 120. A rotational bias mechanism may be utilized to impart a torque between the collar 120 and stationary members of the collet assembly 100. For example, as described above, the rotational bias mechanism may include a cable 190 and/or a linear compression collet spring 180. The stationary housing 130 may be shaped to inhibit axial movement of the collar 120 and rolling members 105. In an embodiment, collet assembly 100 includes features to keep the collar and rolling members axially positioned with respect to the other collet assembly components, rather than being dragged or pulled away from the other collet assembly when the shaft is moved within the collet assembly 100. For example, it can be seen from FIG. 7 that the rolling members 105 and collar 120 are prevented from escaping the housing 130 axially by a seal 140 component that connects to the housing and retains the rolling members and collar inside of the housing. The rolling members 105 and collar 120 are free to rotate about the shaft while being acted upon by the rotational bias force Without the fixed collet 110 described above with respect to other embodiments, the assembly may have a collar 120, and several rolling members 105 disposed about the circumference of a shaft 41. The shaft 41 may be keyed in its rotational orientation with respect to the housing 130. For example, the collet assembly 100 may include one or more key features to interface with channels in a wear tube, which may be attached to the housing 130 of collet assembly 100. The keyed interface between these components is describe more with respect to FIG. 10 below, but are introduced here to clarify that the holding system may include features to fix the collet assembly 110 in relation to shaft 41 so that the rotational bias mechanism acting upon the collar 120 may cause the rolling members 105 to clamp directly upon the shaft 41 in the absence of the collet 110 member. Thus, the housing 130, wear tube 90, and seal 140, may restrict axial movement of the rolling members 105 and shaft 41 with respect to itself and the stationary components, and simultaneously, the keyed interface between the components may allow for the collar 120 to rotate about its axis relative to shaft 41 to move the rolling members 105 toward a shaft surface and to toggle between the actuated (unlocked) and unactuated (locked) states. Torque applied to the collar 120 can displace the collar, resulting in movement of the rolling members 105 towards a position having a reduced annular gap between the shaft 41 and the collar 120. Thus, a net radial force may be provided between the collar 120 and the shaft 41, which may be exerted through the rolling members 105.

Figure 8:
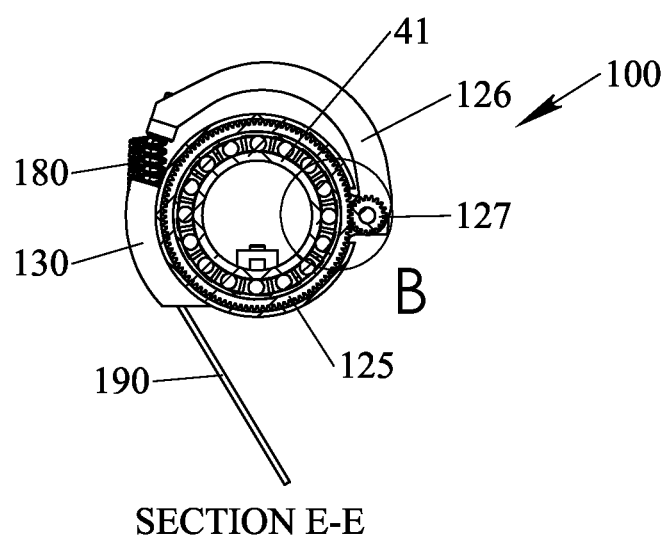
FIG. 8 is a sectional view, taken about line E-E of FIG. 7, of a collet assembly assembled with a shaft in accordance with an embodiment.

Referring to FIG. 8, a sectional view, taken about line E-E of FIG. 7, of the collet assembly 100 is shown. It will be appreciated that the collet 120 is absent in the illustrated configuration. In an embodiment, the rotational bias mechanism includes gears and a lever for mechanical advantage. By placing a larger collar gear 125 fixed to the collar 120, and driving the larger collar gear 125 with a smaller lever gear 127 fixed to a collet lever 126, the rotational bias torque imparted between the collar 120 and housing 130 is imparted by a collet spring 180. The rotational bias torque, however, is amplified by the mechanical advantage of the gears and collet lever 126. Thus, the rotational bias mechanism can be altered to employ any method of force transfer.

In an embodiment, the rolling members 105 may roll directly against one surface of a shaft 41, which may pass through the central channel between the several rolling members 105. In the locked state the rolling members are clamped against the surface of a shaft 41 when the rotational bias force rotates a collar member 120. The rotational bias force may roll the rolling members 105 along ramp surfaces 111, which can be on the collar 120 as illustrated, such that they are rolled into a space between the collar 120 and shaft 41 having a reduced distance. More particularly, the collar 120, or components radially situated relative to the collar 120, e.g., shaft 41, may be shaped such that the space between the components is not uniform, but instead includes a first distance at some sections and a second, wider distance at others. Thus, a clamping force between the shaft 41 and a collet assembly 100 can be generated by relative movement between the shaft 41 and, e.g., collar 120, to wedge the rolling members between and lock the components together. The clamping force may be increased by adding a rolling member 105 in the space between the shaft 41 and collar 120 such that the friction evoked during the clamping operation is reduced to rolling friction instead of sliding friction. In an embodiment that omits collet 110 from collet assembly 100, the primary friction surface that is both sliding and clamping is upon the surface of the rolling members 105. It may be more difficult to change the friction properties of a rolling member 105 because of its unique manufacturing process, strength requirements, and shape. This observation can be contrasted with the ease of changing the friction properties of collet 120 member discussed previously, e.g., by applying a polymer coating to sliding and/or rolling surfaces.

Figure 9:
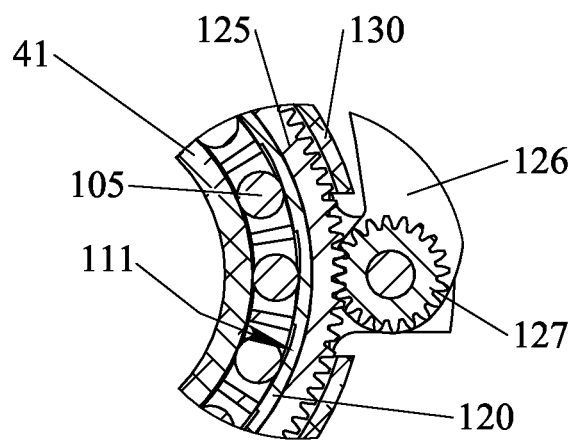
FIG. 9 is a detail view taken from Detail B of FIG. 8, of a collet assembly assembled with a shaft in accordance with an embodiment.

FIG. 9 is a detail view of taken from Detail B of FIG. 8. Some of the features described above with respect to FIG. 8 are rendered in greater detail. For example, the gear teeth of collar gears 125 and 127 are shown. Furthermore, several rolling members 105 are shown disposed between respective ramp surfaces 111 on an inner surface of collar 120, and shaft 41. The ramp surfaces 111 may each include first and second edges that are spaced apart from the outer surface of shaft 41 differently. For example, a first edge may be closer to shaft 41 than a second edge. Thus, ramp sidewalls may be disposed between each ramp surface 111, e.g., a ramp wall may extend perpendicular from a first edge of a first ramp surface 111 to a second edge of a second ramp surface. In an embodiment, the ramp walls keep adjacent rolling members 105 separated from each other, functioning similar to cage 115. In an embodiment, cage 115 is omitted from collet assembly 100 and ramp walls extend radially inward, protruding from collar 120 beyond the first edges of the ramp surfaces 111, to create stop features that separate adjacent rolling member 105.

Figure 10:
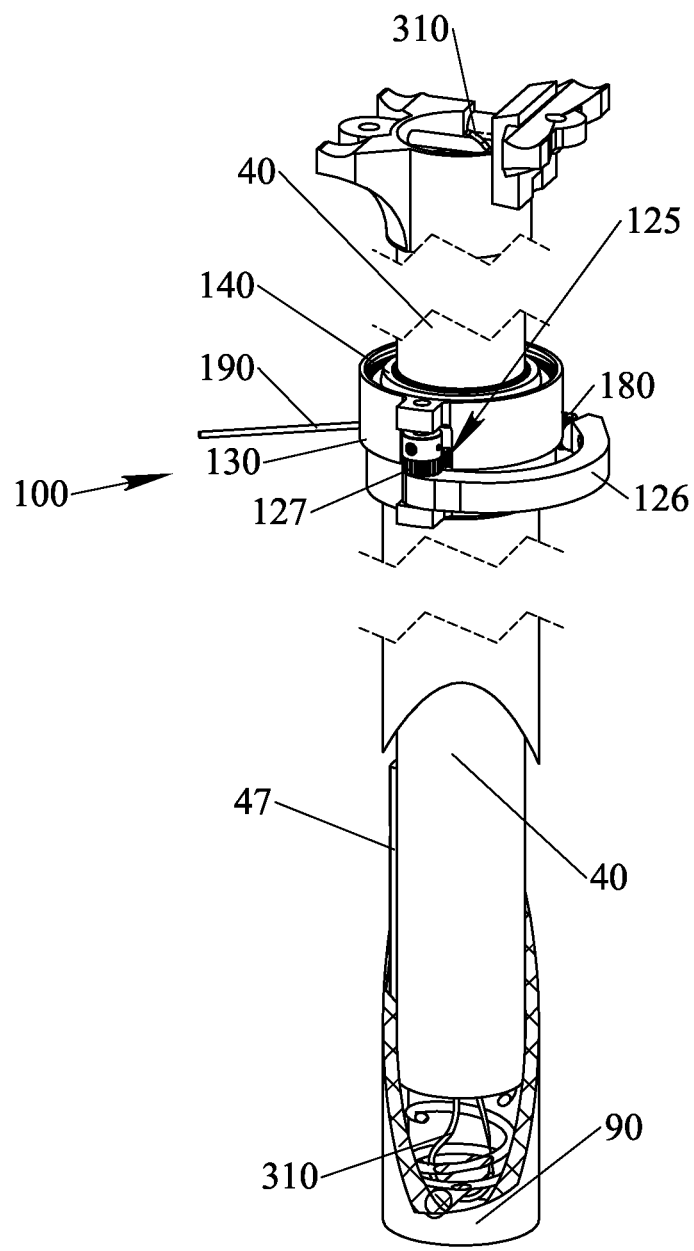
FIG. 10 is a collet assembly assembled with a seatpost keyed to a wear tube in accordance with an embodiment.
Figure 11:
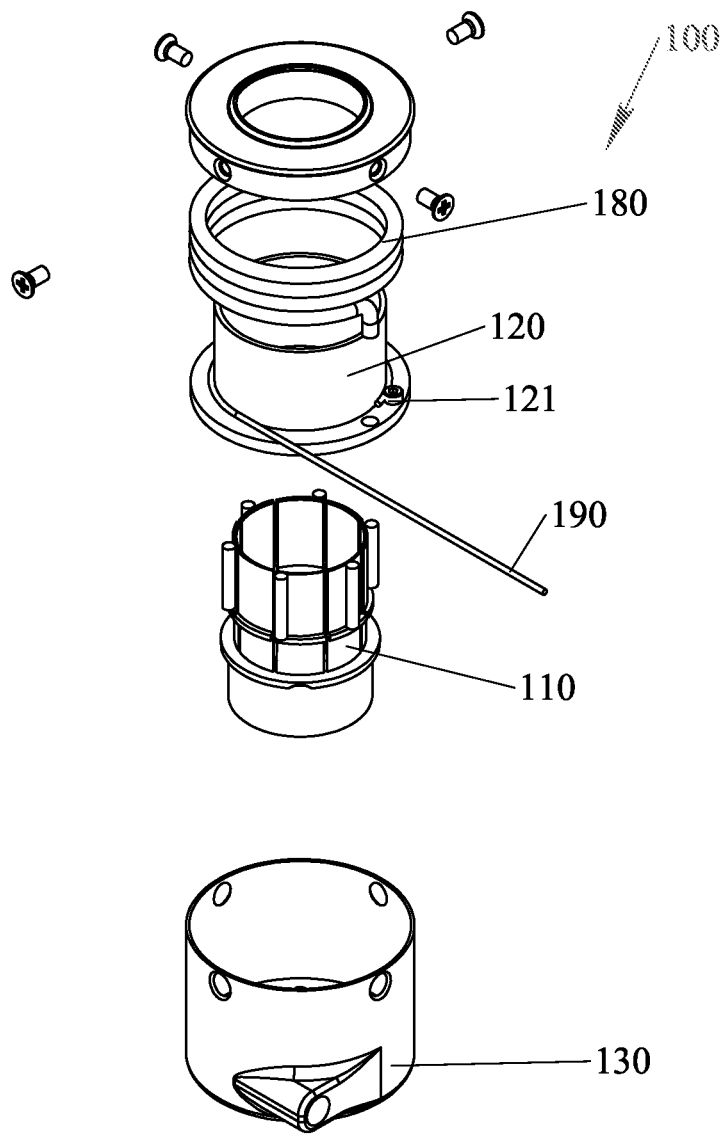
FIG. 11 is an exploded view of a collet assembly with a torsion-type collet spring in accordance with an embodiment.

FIG. 10 shows a collet assembly 100 assembled with a keyed seatpost 40 (which is a form of shaft 41) and keyed wear tube 90. This embodiment of the collet assembly includes a seatpost 40 keyed to a stationary component such that it can be moved in a long axis direction, while restraining the shaft from rotating about the long axis with respect to a stationary housing 130. The complete assembly, including a keyed wear tube 90 attached to a housing 130, allows desirable function of the collet assembly 100 when no collet 110 is employed. Without these features, the collet assembly 100 and housing 130 could rotate about a shaft 41 or seatpost 40 when the rotational bias mechanism is engaged, i.e., when the collet assembly 100 is in the unactuated state, resulting in poor clamping performance FIG. 11 shows an exploded view of an embodiment of collet assembly 100 with a torsion type collet spring 180. The illustrated collet assembly 100 uses a torsion spring type collet spring 180 to impart a rotational bias force upon the collar 120. In an embodiment, the cable 190 does not encircle the collar 120 completely. For example, the cable may wrap around collar 120 over less than a full turn, and may be attached to the collar by cable cleat 121. In an embodiment, the cable cleat 121 may be a single screw, which secures the cable 190 to the collar 120. A first end of the collet spring 180 may be inserted into a hole in the collar 120 and a second end of the collet spring 180 may be inserted into a hole in the seal 140. Once assembled, the collet spring 180 can be wound by turning the seal 140 with respect to the housing 130 and then the seal 140 may be anchored to the housing. Because the seal 140 is connected to the housing 130, and the housing is connected to the collet 110, the collet spring 180 provides a constant rotational bias force between the collar 120 and the collet 110, since the first end will press on the collar in one direction and the second end will press on the seal in an opposite direction. Accordingly, the rotational bias force may be effected by a member that biases collar 120 in a rotational direction under compression, e.g., a torsion spring held in a wound-up configuration, or the rotational bias force may be effected by a member that biases collar under tension, e.g., cable 190.

Figure 12:
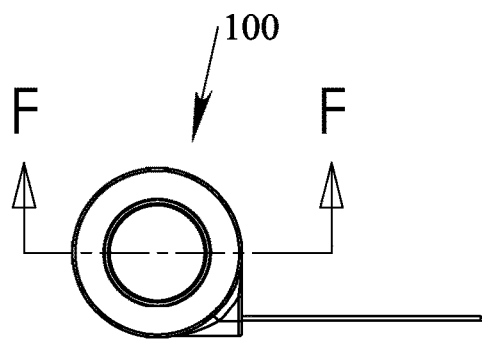
FIG. 12 is a top view of a collet assembly with a torsion-type collet spring in accordance with an embodiment.

FIG. 12 is a top view of a collet assembly 100 which utilizes a torsion spring to impart a rotational bias force on the collar. The view is not cut away and can be used to illustrate the extent to which the components of an actuated collet assembly 100 can be completely concealed within a housing. That is, the housing may enclose and provide protection against dirt, debris, etc. to the collet, collar, rolling members, etc. FIG. 12 also shows the origin of cut view F-F.

Figure 13:
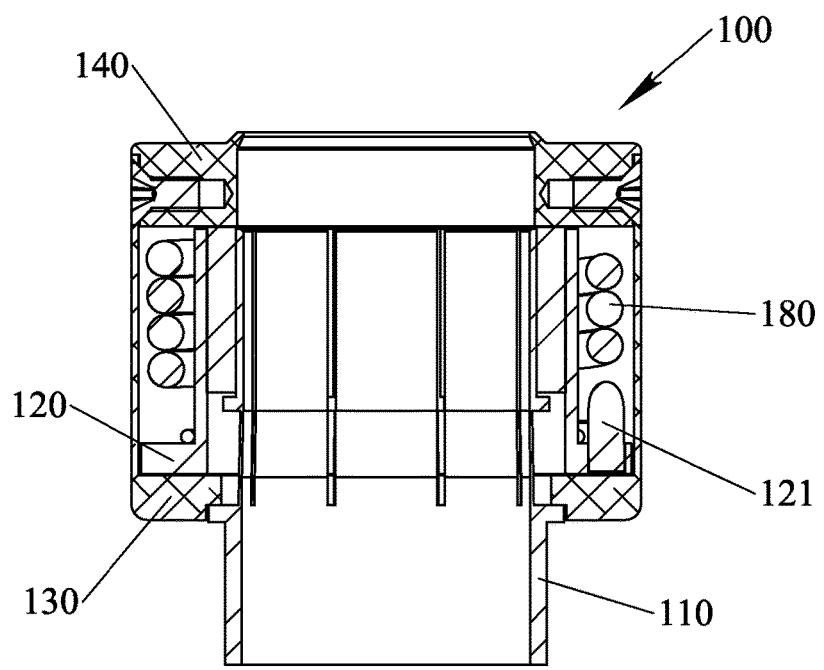
FIG. 13 is a sectional view, taken about line F-F of FIG. 12, of a collet assembly with a torsion-type collet spring in accordance with an embodiment.

FIG. 13 is a sectional view, taken about line F-F of FIG. 12, illustrating a collet assembly 100 utilizing a torsion spring to impart a rotational bias force on a collar 120 discussed previously. As shown, the torsion spring 180 may be enclosed by housing 130 and seal 140. More particularly, the torsion spring 180 may be disposed between housing 130 and collet 110, concentrically placed around collar 120. Torsion spring 180 may be secured at one end to collar 120, and at another end to seal 140.

Figure 14:
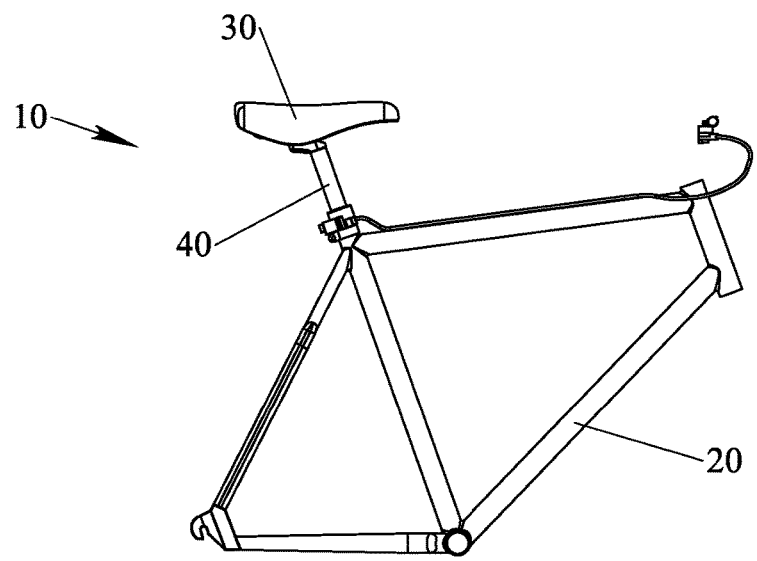
FIG. 14 is a side view of a portion of a bicycle having a holding device in accordance with an embodiment.

Referring to FIG. 14, a side view is shown of a portion of a bicycle having a holding device in accordance with an embodiment. An immediate application for such a shaft positioning device is on a bicycle 10. It is desirable to easily change the position of bicycle seat 30 with respect to the bicycle frame 20 by controlling the position of the seatpost 40.

Figure 15:
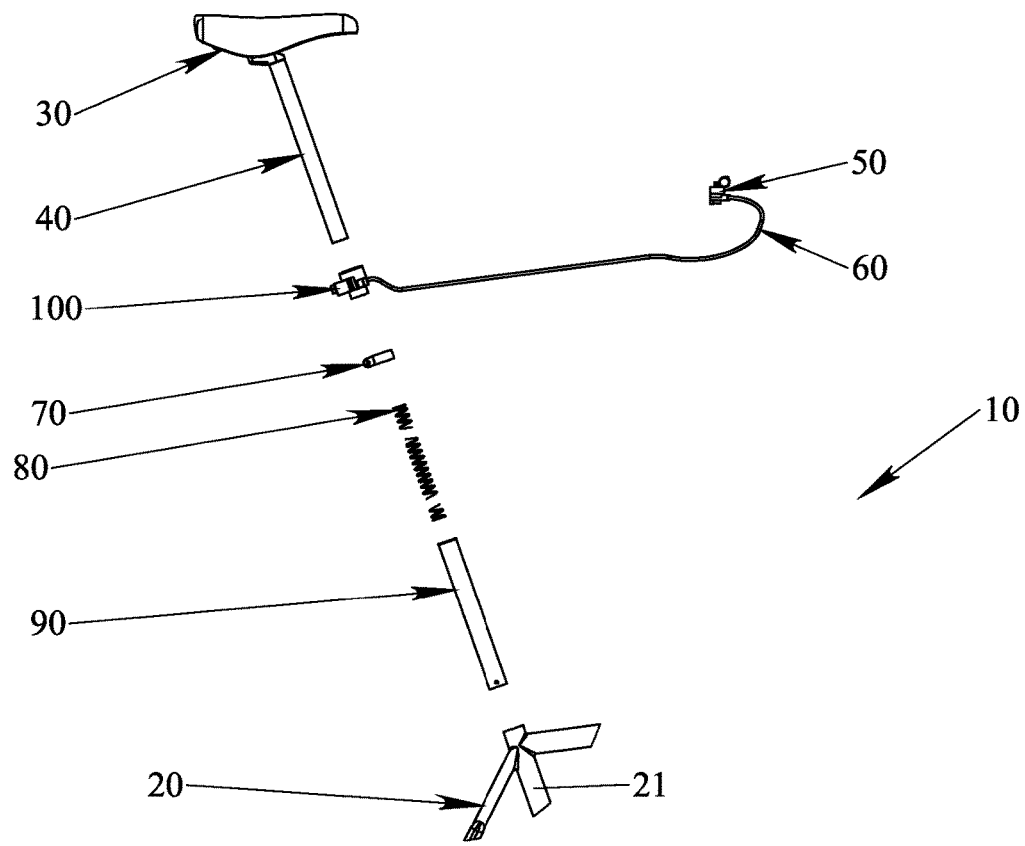
FIG. 15 is an exploded view of a portion of a bicycle having a holding device in accordance with an embodiment.

Referring to FIG. 15, an exploded view of a portion of a bicycle having a holding device in accordance with an embodiment is shown. The collet assembly 100 may be used for positional control of the bicycle seatpost 40. More particularly, collet assembly 100 may be actuated with an actuator lever assembly 50 positioned near the bicycle operators hands while riding. This actuator lever assembly 50 may be connected to the collet assembly 100 by an actuation cable housing 60 which guides the actuation cable 190, discussed previously. Thus, actuation forces may be transmitted between the actuator lever assembly 50 and the collet assembly 100 through cable 190. The operator may actuate the collet assembly 100 by applying a force, e.g., pressing or pulling, on a lever on the actuator lever assembly 50. Pressing the lever may apply tension to the cable 190 which opposes and/or counteracts the rotational bias force present in the collet assembly 100. More particularly, the force applied to the actuator lever assembly 50 may generate a counter-torque applied to collar 120, which counteracts the rotational bias torque applied by the rotational bias mechanism. Thus, when the counter-torque exceeds the rotational bias torque, the collar 120 may be actuated to toggle the collet assembly 100 to the unlocked state by rolling the rolling members to a location that releases the clamping force on the seatpost 40. Accordingly, an actuation force can be applied remotely from the collet assembly 100 to adjust the seatpost height during a bike ride.

In order to aid the bicycle operator in raising the seat once the collet assembly 100 has been actuated, a shaft spring 80 may be added to the holding system. The shaft spring 80 can urge the bicycle seatpost 40 towards the upward position when the collet assembly 100 is actuated and the user is moving the seatpost 40. Similarly, to move the seatpost 40 downward, the user need only apply an axial force on the seatpost 40 in a single direction (downwards, opposing the shaft spring 80 force) when the collet assembly 100 is actuated. In an embodiment, a bicycle seat post clamp 70 attaches the collet assembly 100 and wear tube 90 to the bicycle frame 20 by clamping about the components.

In this application the operational loading on the seatpost 40 may be between 180 pounds (800 N) and 300 pounds (1334 N), depending on the weight of the rider. For a friction coefficient between the collet 110 and the seatpost 40 of 0.17, the net radial component of force needed to retain the seatpost, imparted by the collar 120 and rolling members 105, will be between 1060 pounds (4715 N) and 1765 pounds (7851). Thus, for a collet assembly 100 having ramp surfaces 111 incorporating ramp angles of 1.75 degrees, and having a rotational bias torque of 26 inch pounds, a user may actuate the collet assembly 100 by applying an actuation force of less than 10 pounds, e.g., 7 pounds (31 N) or less, to the thumb lever.

Still referring to FIG. 15, for a mechanism whose purpose is to provide engagement and disengagement between objects, such as a bicycle frame 20 and seat-supporting seatpost 40, it is desirable to ensure continuous smooth action between moving components such that they do not wear while maintaining constant low friction values between components. A wear tube 90 may be placed inside the supporting frame tube 21 of the bicycle frame 20. The wear tube 90 may have a length that spans the entire distance that the two components are designed to move relative to each other, and the wear tube 90 may be formed from a suitable material to wear directly upon the surface of the seatpost 40. Thus, it may be possible to eliminate additional wear material captured at the end of the seatpost 40 component. The bicycle seatpost 40 may not necessarily capture an additional sliding wear material. The wear tube 90 material captured by the rigid bicycle frame 20 may be composed of light weight polymer materials instead of heavier, stiffer, materials such as alloy metal. In one embodiment the wear tube 90 can be equipped with a key or channel feature 48 to maintain rotational alignment with respect to a seatpost 40 having a complementary key or channel feature 48. If the wear tube 90 is loaded mainly in torsion during actuated movement, e.g., in the unlocked state, and then primarily loaded in radial compression during the unactuated, locked state, the wear tube 90 may be formed from a material having a tensile strength lower than 15,000 lbs/in$^2$, and/or a modulus of elasticity less than 800,000 lbs/in$^2$. One skilled in the art will recognize that these material properties are considered to have low strength properties, and accordingly, the wear tube 90 described herein may provide a cost advantage over existing wear materials that are typically formed from metal alloys. More particularly, it is contemplated that the holding system for adjusting seatpost position as described herein may include a wear tube 90 formed from low-cost polymer materials. Another advantage of such a configuration is that lower density materials used to form wear tube 90 may provide a weight advantage, i.e., may allow for a holding system that is lighter than existing seat adjustment mechanisms. Wear tube 90 materials may have a density less than 0.08 lbs/in$^3$, e.g., 0.068 lbs/in$^3$, to provide a lower weight holding system, as compared to existing seat adjustment mechanisms for controlling seatpost position. In an embodiment, wear tube 90 may include polymer materials that are filled with high strength fibers, which can be manufactured to far exceed the tensile strength and elastic modulus numbers listed above while still maintaining a density less than 0.08 lbs/in$^3$, e.g., 0.068 lbs/in$^3$. These materials, however, cost more than the low-cost polymer materials described above.

In an embodiment, the wear tube 90 may be formed from a metal alloy. More particularly, an alloy wear tube 90 may be employed when the collet assembly 100 does not provide a rigid hold about all axes of motion of the seatpost 40, or when the collet assembly is not directly attached to the bicycle frame but is instead attached to the bicycle frame by way of a long wear tube 90. In such cases, wear tube 90 may benefit from the additional stiffness that a metal alloy may provide.

The collet assembly 100 as described above advantageously includes a low profile and weight, and thus, lends itself to being mounted external to a bicycle frame 20. More particularly, relatively short structural members may be used between the frame and the locking assembly to mount the collet assembly 100. Thus, the collet assembly 100 may be attached to the bicycle frame in a number of advantageous ways. As described previously, it is partially due to this external mounting that the use of lower strength and lighter weight wear tube materials is enabled, further lightening the seatpost 40 control system.

Figure 16:
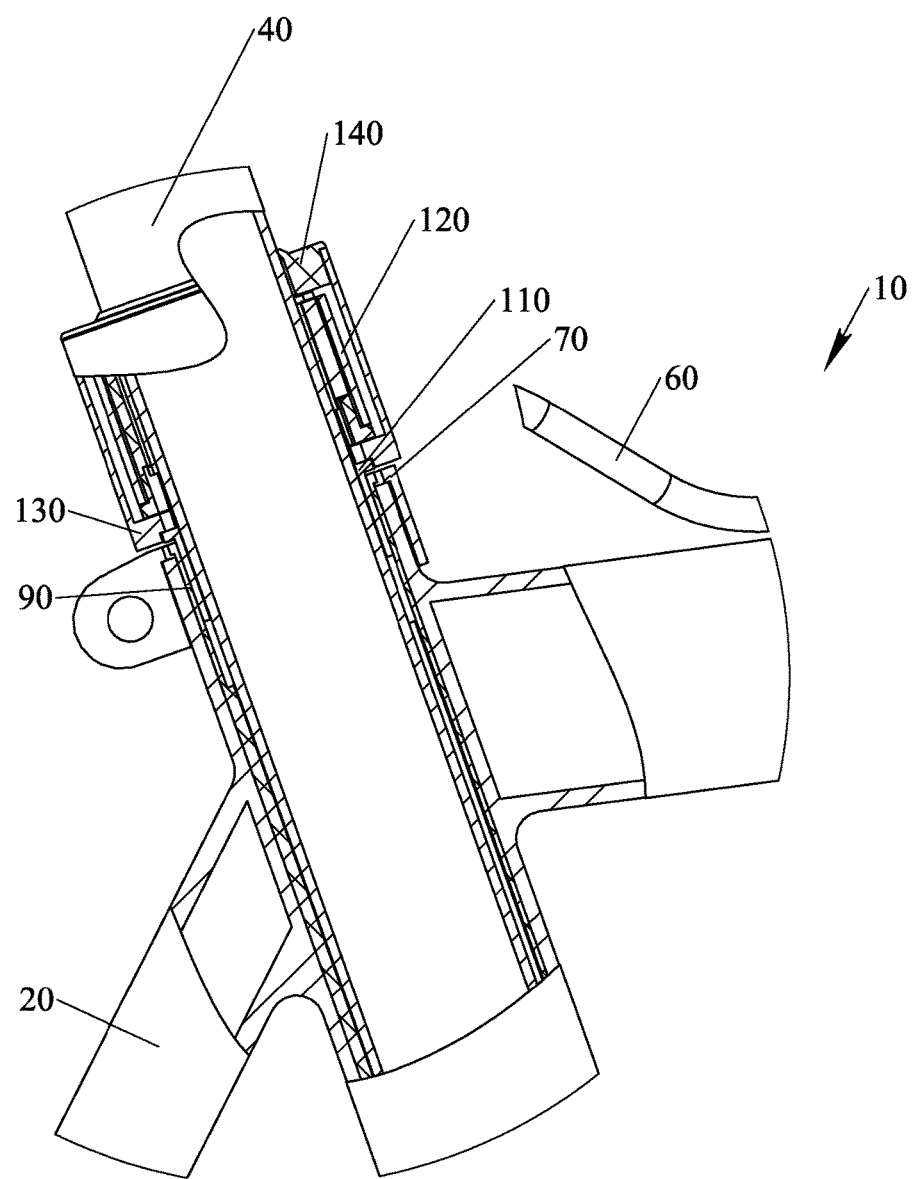
FIG. 16 is a cutaway view of a portion of a bicycle having a wear tube between a holding device and a seatpost in accordance with an embodiment.

Referring to FIG. 16, a cutaway view is shown of a portion of a bicycle having a wear tube between a holding device and a seatpost in accordance with an embodiment. One method of attaching such a lightweight, low strength, wear tube 90 to a bicycle, with associated seatpost 40 control mechanism, is by utilization of the standard bicycle seat post clamp 70. In order to retain the seat post clamp mechanism employed on most modern bicycles, one embodiment of collet assembly 100 has a base portion 113 that is rigidly attached to the collet 110, such that the base 113 can be disposed between the seatpost 40 and the bicycle frame seatpost clamp 70. For example, the base portion 113 may be a cylindrical tube that extends contiguously from the clamping portion of collet 110. This relationship is illustrated in FIG. 16. Furthermore, in an embodiment, the polymer wear tube 90 material can be disposed between the base portion 113 and the frame 20 such that, when the seatpost clamp 70 is tightened around the frame tube 21, it pinches the polymer wear tube 90 material between the frame tube 21 inner surface and the ring-shaped base portion 113. Here, ring-shaped is descriptive of an annular base portion 113, but base portion 113 need not be entirely cylindrical, e.g., it may have slots or holes formed through it for additional weight advantage. Thus the polymer wear tube 90 and the collet assembly 100 can be rigidly attached to a bicycle frame 20 using the standard seatpost clamp 70 mechanism. The base portion 113 may be thick enough to not buckle or deform under the clamping force of the seatpost clamp 70 mechanism. Furthermore, the base portion 113 may be formed from a material that causes it to wear favorably when sliding against the outer surface of the seatpost 40. By way of example, the thickness of the base portion 113 may be between 0.018 inch to 0.050 inch, e.g., 0.020 inch, and base portion 113 may be formed from brass, aluminum, or stainless steel.

Figure 17:
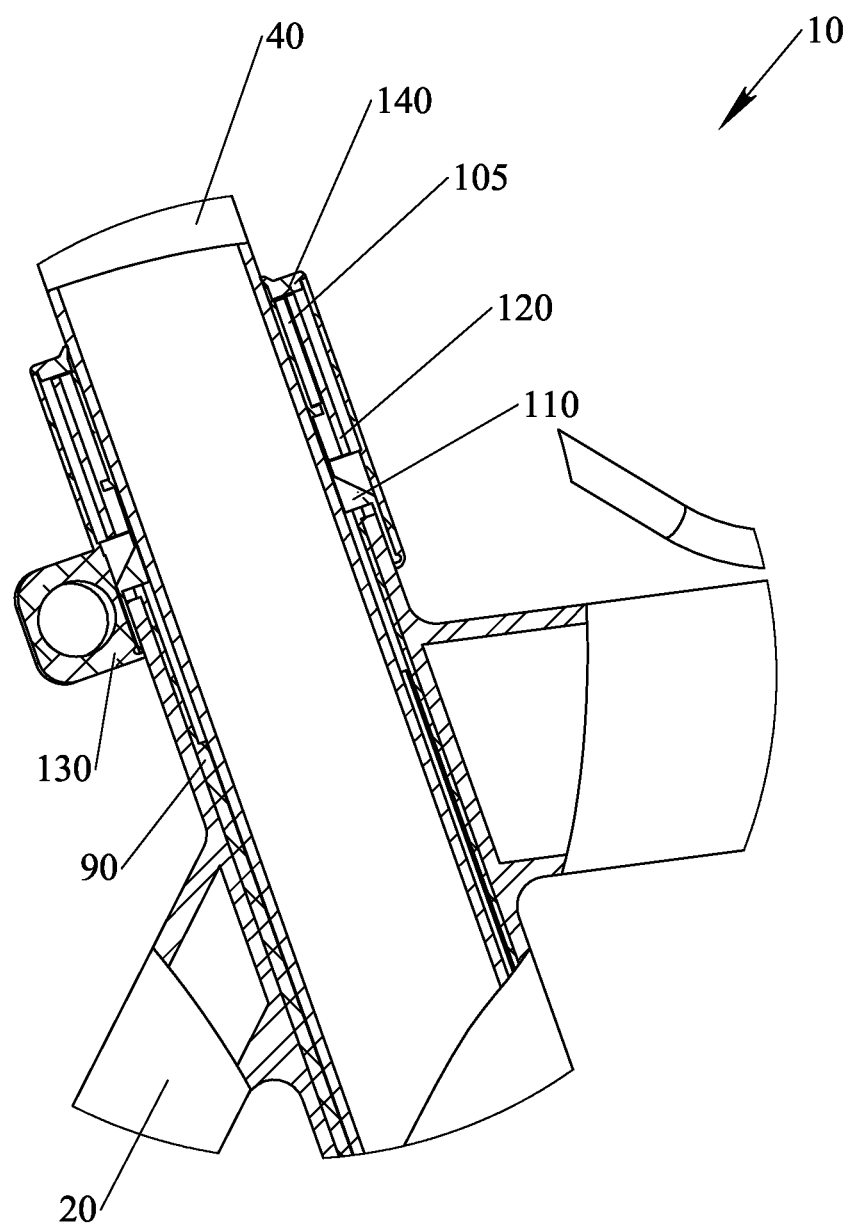
FIG. 17 is a cutaway view of a portion of a bicycle having a wear tube between a holding device and a seatpost in accordance with an embodiment.

Referring to FIG. 17, a cutaway view is shown of a portion of a bicycle having a wear tube 90 between a holding device and a seatpost in accordance with an embodiment. Another method of attaching a collet assembly 100 to a bicycle frame 20 is by integration of housing 130 into a seatpost clamp 70. By eliminating the requirement that the collet 110, or member connected to the collet, such as housing 130, be inserted between the seatpost 40 and bicycle frame tube 21, the material surrounding the seatpost 40 may no longer be required to resist deformation under the seatpost clamp 70. FIG. 17 illustrates a cutaway view of a collet assembly 100 attached to a bicycle frame by its housing 130, which is in effect integrated with a seatpost clamp 70 member. This assembly differs from the similar assembly shown in FIG. 16, which is not integrated as described above, because it does not include the seatpost clamp 70 and the collet assembly 100 does not include a protrusion, e.g., base portion 113, that is inserted into the wear tube 90 and/or the bicycle frame 20. Because the bicycle frame 20 may still be subject to the circumferential clamping loads of a clamping member, but may no longer be clamped about a central rigid member such as seatpost 40, the bicycle frame 20 may be modified. Such a modification may allow the bicycle frame tube 21 to be manufactured without any additional splits which traditionally allow the frame tube 21 to deform and clamp around a traditional seatpost 40. This method of attaching such a collet assembly 100 to a bicycle frame 20 may further enable lower weight assemblies by allowing the lower density wear tube 90 to be thinner in wall thickness and simultaneously allowing for the seatpost 40 member to be larger in diameter by the same amount for a given bicycle frame tube 21 inner diameter. In an embodiment, when a low strength and low density wear tube 90 is employed, it attaches to the collet assembly 100 differently than described above. Since the wear tube 90 is no longer squeezed between the fixed base portion 113 components of the collet assembly 100 and the frame tube 21, it may be mechanically connected to the collet assembly 100. For example, wear tube 90 may be attached to the collet assembly by an adhesive bond, a threaded coupling, welding, or any other commonly used attachment technique. In an embodiment, keying by addition, or re-use, of channel features 48 on both the collet assembly 100 components or wear tube 90 component may be employed.

For some materials chosen as candidates for the wear tube in the above-described embodiments, the wall thickness of the wear tube may be greater than 0.010 inch, e.g., between 0.011 inch and 0.028 inch, in order to withstand operational tensile forces. If a rigid ring is placed inside the wear tube 90 that must withstand the clamping pressures of the seat post clamp 70 described earlier, the seatpost 40 diameter may be smaller than the inner diameter of the frame tube by twice the combination of the two thicknesses, e.g., between 0.058 inch to 0.116 inch smaller.

If the collet assembly 100 is integrated with an external seat post clamp 70 then it could be possible to decrease the clearance between the seatpost 40 and the frame tube 21 to the required thickness of the wear tube 90, e.g., greater than 0.010 inch, e.g., between 0.011 inch to 0.028 inch.

FIG. 18 illustrates a dimetric view of a seatpost 40 having a key 47. The key 47 may include a key surface radially outward of an outer surface of the seatpost 40, i.e., the key may have a thickness extending outward from the seatpost. Furthermore, the key surface may extend around a majority of a perimeter of the seatpost. For example, the seatpost 40 may be disposed over at least a 180 degree swath of the perimeter of the seatpost, e.g., around an angle of 270 degrees. With a holding device to control the position of a bicycle seatpost working with a lightweight, low strength, wear tube 90, as described in the above embodiments, it is advantageous to further reduce the weight and complexity of the assembly. With higher tolerances for wear and lash about shaft key features, as well as reducing the bending strength and stiffness requirements of the wear tube 90, as enabled by support of a wear tube entirely within a bicycle frame tube 21, the wear tube wall thickness can be thinned down to a range between 0.011 inch to 0.028 inch. This allows room for a key 47 to extend radially outwards from a seatpost 40 surface by 0.018 inch to 0.063 inch without requiring the seatpost tube diameter to be decreased in diameter by an unacceptable amount. The key 47 may wrap around the majority of the circumference of the seatpost 40 without risk of insufficient strength in the wear tube 90 member (the wear tube 90 may be reduced in thickness over the same angle that the key 47 envelopes about the seatpost 40). A key 47 member that is more significant in shape and size than a standard key, which is typically a rectangular or cylindrical bar having a cross section of around 0.19 inch by 0.19 inch, may be mounted to a hollow tubular seatpost 40 with standard countersunk head screws of metric sizes, e.g., M3, or standard sizes, e.g., #4. If a sufficient drill guide is provided, a bicycle repair shop or home mechanic can cut a seatpost 40 to the desired length and add required screw holes through the wall thickness of the seatpost 40 tube for attaching the key 47. Thus, the wear tube 90 and the key 47 may be sold as a kit that is assembled and installed by a consumer.

Key features typically require that the seatpost 40 tube material have sufficient wall thickness to allow for a machined slot, parallel to the tubes long axis, that does not penetrate through the wall of the seatpost 40 tube, and also requires sufficient bearing area on all contact surfaces. These key features require tapped holes in some cases, and many times require more than one specially designed component to attach a key 47 to the seatpost. Thus, existing bicycle seatposts having key features cannot be cut to length with standard bicycle repair shop tools, or even moderately custom repair shop tools. It is this feature that drives seatposts 40 to be manufactured at pre-fabricated lengths for adjustability over a pre-determined range.

FIG. 19 is an end view of an embodiment of a seatpost key 47 assembled onto associated seatpost 40. In an embodiment, the key may envelope about the circumference of the seatpost 40 through an angle of more than 180 degrees, such as in a range of 210 to 350 degrees, e.g., 270 degrees. Visible in the illustration are two nuts on the interior of the seatpost 40 designed to accept threads of standard threaded fasteners. By enveloping a substantial portion of the seatpost 40 circumference, the size of the key 47 can be increased and it can be supported by the surface of the seatpost 40 tube through the entire angle that it surrounds the seatpost tube.

FIG. 20 is an end view of an embodiment of wear tube 90 incorporating a fold shaped feature 220 about its circumference. The wear tube 90 of FIG. 20 is an embodiment designed to accept an embodiment of key 47 in which the key substantially envelops about the circumference of the seatpost 40. The fold shaped feature 220 can be described as a disruption of the hollow cylindrical shape of the wear tube 90 in that a peripheral path along its outer surface includes one or more sharp turns such that the circumferential path is interrupted by a segment nearly perpendicular to the tangent and nearly parallel to a radial path. Accordingly, the peripheral path along the outer surface around the wear tube 90 includes one or more circumferential segments and one or more transverse segments. With this type of feature, any radial loading due to a change in circumferential length of the wear tube 90 or binding due to a change in diameter of the wear tube 90 is relieved because the wear tube 90 material is allowed to bend about the sharp turn in its circumferential profile. It is contemplated that the radial force will be much less for a diametric change in which a thin profile of material is loaded in bending as opposed to a similar profile loaded in direct compression.

As discussed previously, the wear tube 90 allows a seatpost 40 or shaft 41 to slide with low friction while simultaneously providing a channel feature 48 to prevent undesired rotation of the shaft 41 passing through the wear tube 90 and shaft position control device. The introduction of the fold shaped features 220, whose crease runs parallel to the axis of the wear tube 90, such as those illustrated in FIG. 20, may reduce or eliminate the issues of swelling due to moisture, excessive dimension change due to a high coefficient of thermal expansion, or general distortion due to dimensional instability of the material. With this feature, the critical dimension of radial thickness may be relatively constant as compared to changes in other dimensions such as circumferential material length and axial length. A change in circumferential length may not affect the working diameter of the wear tube 90 because the surrounding frame tube 21 of the bicycle may constrain its growth, even if the respective coefficients of thermal expansion differ. The change in circumferential length can be taken up by flexing of the fold shaped features 220. In an embodiment, a nominal outer circumferential diameter of the wear tube 90 may be greater than that of a frame tube 21 that receives the wear tube 90, as the fold shaped features 220 allow elastic change of this dimension at installation.

FIG. 21 is a dimetric view of an embodiment of a seatpost 40 and associated key 47 in the exploded state. Because the key includes a cylindrical protrusion which can fit inside the seatpost 40, it is feasible for many different key designs to be utilized without the use of machined features on the seatpost 40 being affected. A key may be attached to a standard seatpost 40 tube with the use of standard tools if the key 47 is of sufficient structural shape and size to be supported by the inner diameter of the bicycle seatpost 40. In an embodiment, the location of interface and attachment between the key and the seatpost 40 may be on the inner diameter of a hollow seatpost 40 tube, while the key 47 features may extend radially outwards of the seatpost 40 surface from the portion of the key that extends axially outwards and beyond the end of the seatpost 40 tube. The illustrated key in FIG. 21 incorporates several radially protruding key features, e.g., three key features, to interface with corresponding channel features 48 in the wear tube 90. For example, the protruding key features shown on an outer surface of key 47 in FIG. 21 may be sized and shaped to mate with the key slots formed on an inner surface of wear tube 90 shown in FIG. 23. Embodiments of a key 47 may simplify movable shaft design and manufacturing by reducing the requirements for lathe and mill machines and can empower bicycle mechanics to modify seatpost 40 components for optimal length and weight without having to order new, special components.

FIG. 23 illustrates an end view of an embodiment of a wear tube design. The wear tube profile illustrated in FIG. 23 includes three fold shaped features 220 about its circumference, e.g., evenly spaced. Additionally, it includes three channel features 48 about its circumference e.g., evenly spaced around an inner surface. Each of the channel features 48 may be sized, shaped, and positioned to receive rectangular-shaped key features protruding from key 47. In an embodiment, there are three key protrusions on key 47, and three channel features 48 on wear tube 90.

FIG. 24 is a side view of a bicycle seatpost 40 assembly and also shows the origin of section view FIG. 25. The seatpost 40 of FIG. 24 is assembled with a collet assembly 100 and wear tube 90.

FIG. 25 is a section view of a bicycle seatpost 40 assembly illustrating the placement and implementation of a connector 310 member, which may limit an upward final position of a bicycle seatpost 40. When a holding device, e.g., collet assembly 100, is mounted external to a bicycle frame 20 to control a position of the bicycle seatpost 40, but where the wear tube 90 is not structurally sufficient to provide lateral support to the holding device when protruding from a bicycle frame tube 21, it may be necessary for the user to adjust the maximum height of the seatpost 40 such that the seatpost 40 can protrude from the holding device. For example, a seatpost clamp 70 may be tightened around bicycle frame tube 21 to retain wear tube 90 at a location such that collet assembly 100 is separated from bicycle frame tube 21 by a first distance, and the collet assembly 100 may be locked/unlocked to allow adjustment of the seatpost 40 upward or downward within wear tube 90 to raise connector buckle 320 higher or lower relative to the bicycle frame tube 21.

A maximum height of a bicycle seatpost 40 may be set by connecting the seatpost 40 member to the bicycle frame member with a connector 310 member. For example, the connector 310 may be a string, a linear spring, a chain, etc. One end of the connector 310 can be rigidly attached to any component that is connected to the bicycle frame. In one embodiment the connector 310 can be connected to a cross member 340 that is connected to the bottom of the wear tube 90 member. A second end of the connector 310 may be connected to the seatpost 40 that is connected to the seat, e.g., at an end of the seatpost. For example, the connector may be passed through a hole in the end of the seatpost 40. Accordingly, a maximum seat height can be predetermined to be the distance between the first and second end of the connector 310 when the connector 310 is in a fully extended state. It is convenient to describe the position limiting connector 310 member as a string connected between the bicycle frame and the seatpost, but this member can take many forms which limit the distance that the seatpost 40 can be extended away from the bicycle frame 20 or frame tube 21 while still allowing the two members to contract, decreasing the distance between the two points that each end of the connector 310 member are connected to. An example of such a connector 310 member is illustrated in FIG. 25 and is represented as a string.

In an embodiment, the maximum length of the connector 310 may be changed to control the maximum seat height. With the implementation of a connector 310 member that can be altered in length by the user, the user does not need a seatpost 40 and associated key 47 fabricated to protrude at the exact length from the position adjustment mechanism. Instead, he can adjust the length of the connector 310 member. In an embodiment, it may be desirable for the user to easily adjust the length of the connector 310 such that the maximum height of the seatpost 40 can be reset. The embodiment illustrated shows a connector buckle 320 as one possible method of making a connector 310 adjustable in length. When the connector buckle is in the downwards and latched position, an over-center cam squeezes the connector 310 against the seatpost 40 such that the connector 310 may not slip against the seatpost 40, thus fixing its length. The connector buckle 320 can be lifted to rotate the over-center cam lobe away from the string when it is desired to reset the effective length of the string connector 310.

In the foregoing specification, the invention has been described with reference to specific exemplary embodiment thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A holding device, comprising:
   a collet having a clamping portion including a collet surface around a central axis, wherein a first location on the collet surface is offset from a second location on the collet surface in a circumferential direction around the central axis;
   a collar rotatable relative to the collet about the central axis, wherein the collar includes a collar surface facing the collet surface;
   a plurality of rolling members between the collar surface and the collet surface such that rotation of the collar relative to the collet about the central axis rolls a rolling member of the plurality of rolling members over the collet surface in the circumferential direction from the first location to the second location to move the clamping portion orthogonal to the central axis; and
   a rotational bias mechanism coupled to the collar to bias the rolling member to the second location.

2. The holding device of claim 1, wherein the collar surface is separated from the collet surface by a first radial distance at the first location and a second radial distance at the second location, the first radial distance being greater than the second radial distance.

3. The holding device of claim 2, wherein the clamping portion includes a plurality of fingers extending axially from a base portion of the collet, wherein one or more of the collar surface or the collet surface includes a plurality of ramp surfaces circumferentially arranged around the central axis, and wherein the rolling member is a cylindrical rolling member in rolling contact with a respective ramp surface.

4. The holding device of claim 3 further comprising a stop tang to limit rolling of the rolling member along the respective ramp surface.

5. The holding device of claim 3 further comprising a housing coupled to the base portion and surrounding the collar, wherein the base portion remains fixed relative to the housing when the collar rotates relative to the collet about the central axis.

6. The holding device of claim 5 further comprising a cage disposed between the collet and the collar, wherein the cage includes a plurality of axial slots circumferentially separated from each other, and wherein the plurality of rolling members are disposed in respective axial slots such that, when the rolling member is in rolling contact with a first finger of the plurality of fingers at the first location, a second rolling member is in rolling contact with a second finger of the plurality of fingers.

7. The holding device of claim 1, wherein the rotational bias mechanism includes a cable coupled to the collar to apply a torque to the collar to bias the rolling member to the second location, and further comprising an actuator coupled to the cable, wherein applying a force to the actuator applies a counter-torque to the collar through the cable to roll the rolling member to the first location.

8. The holding device of claim 1, wherein the clamping portion includes a clamping surface radially inward of the collet surface, wherein the clamping surface defines a channel along the central axis, and further comprising a seatpost in the channel such that rotation of the collar relative to the collet about the central axis clamps the clamping surface onto the seatpost.

9. The holding device of claim 8 further comprising a bicycle frame having a seat tube, wherein the seatpost is disposed in the seat tube.

10. The holding device of claim 1 further comprising:
a seatpost having a seatpost surface, wherein the collar is rotatable about the seatpost, wherein the collar surface faces the seatpost surface, wherein a third location on the collar surface is offset from a fourth location on the collar surface, and wherein the plurality of rolling members are between the collar surface and the seatpost surface such that rotation of the collar relative to the seatpost rolls the rolling member from the third location to the fourth location to move the rolling member orthogonal to the seatpost surface; and
a housing around the collar and the plurality of rolling members, wherein one of the seatpost or the housing includes a key to engage a slot of another one of the seatpost or housing, the key and the slot to limit rotation of the seatpost relative to the housing.

11. The holding device of claim 10, wherein the collar surface is separated from the seatpost surface by a first radial distance at the third location and a second radial distance at the fourth location, the first radial distance being greater than the second radial distance.

12. The holding device of claim 11, wherein one or more of the collar surface or the seatpost surface includes a plurality of ramp surfaces circumferentially arranged around the central axis, and wherein the rolling member is a cylindrical rolling member in rolling contact with a respective ramp surface.

13. The holding device of claim 12 further comprising a cage having a plurality of axial slots circumferentially separated from each other, wherein the plurality of rolling members are disposed in respective axial slots such that, when the rolling member is in rolling contact with the respective ramp surface at the third location, a second rolling member of the plurality of rolling members is in rolling contact with a second ramp surface of the plurality of ramp surfaces.

14. The holding device of claim 10, wherein the rotational bias mechanism includes a cable coupled to the collar to apply a torque to the collar to bias the rolling member to the fourth location, and further comprising an actuator coupled to the cable, wherein applying a force to the actuator applies a counter-torque to the collar through the cable to roll the rolling member to the third location.

15. The holding device of claim 10 further comprising a bicycle frame having a seat tube, wherein the seatpost is disposed in the seat tube.

16. The holding device of claim 1 further comprising:
a seatpost, wherein the holding device is to control a position of the seatpost along the central axis; and
a wear tube coupled to the holding device and having a tube channel coaxially aligned with the seatpost, wherein the wear tube includes a material density less than 0.068 lbs/in$^3$.

17. The holding device of claim 16, wherein one of the holding device or the wear tube includes a key to engage a slot of another one of the holding device or the wear tube, the key and the slot to limit rotation of the holding device relative to the wear tube.

18. The holding device of claim 16, wherein one of the seatpost or the wear tube includes one or more keys to engage one or more slots of another one of the seatpost or the wear tube, the one or more keys and the one or more slots to limit rotation of the seatpost relative to the wear tube.

19. The holding device of claim 18, wherein the one or more keys includes a key on the seatpost, wherein the key includes a key surface radially outward of a seatpost surface, and wherein the key surface is around a majority of a seatpost perimeter.

20. The holding device of claim 18, wherein the one or more keys includes a plurality of keys on the seatpost, and wherein each key includes a radial protrusion extending radially outward of a seatpost surface.

21. The holding device of claim 16, wherein the wear tube includes an outer surface around the tube channel, and wherein a peripheral path along the outer surface around the tube channel includes one or more circumferential segments and one or more transverse segments.

22. The holding device of claim 16 further comprising a bicycle frame having a seat tube, wherein the holding device includes an outer surface, wherein the wear tube includes an inner surface around the outer surface, and wherein the wear tube is between the seat tube and the holding device such that the seat tube is around the outer surface and the inner surface.

23. The holding device of claim 22 further comprising a connector having a first end and a second end, wherein the first end is coupled to the bicycle frame and the second end is coupled to the seatpost to limit movement of the seatpost along the central axis.

* * * * *